(12) United States Patent
Carpenter et al.

(10) Patent No.: US 9,005,673 B2
(45) Date of Patent: Apr. 14, 2015

(54) PRESERVATIVE AND ADDITIVE FOR FOOD AND FEED

(76) Inventors: Robert H. Carpenter, Bastrop, TX (US); Maurice Clarence Kemp, Cedar Park, TX (US); K. Scott McKenzie, College Station, TX (US)

( * ) Notice: Subject to any disclaimer, the term of this patent is extended or adjusted under 35 U.S.C. 154(b) by 871 days.

(21) Appl. No.: 11/989,041

(22) PCT Filed: Jul. 17, 2006

(86) PCT No.: PCT/US2006/027581
§ 371 (c)(1),
(2), (4) Date: Oct. 28, 2008

(87) PCT Pub. No.: WO2007/011825
PCT Pub. Date: Jan. 25, 2007

(65) Prior Publication Data
US 2009/0117206 A1 May 7, 2009

Related U.S. Application Data

(60) Provisional application No. 60/700,592, filed on Jul. 19, 2005.

(51) Int. Cl.
*A61K 33/06* (2006.01)
*A23L 1/06* (2006.01)
*A23K 1/175* (2006.01)
*A23B 4/24* (2006.01)
*A23B 4/12* (2006.01)
*A23B 7/157* (2006.01)
*A23B 7/10* (2006.01)
*A23K 1/16* (2006.01)
(Continued)

(52) U.S. Cl.
CPC .............. *A23K 1/1756* (2013.01); *A23B 4/24* (2013.01); *A23B 4/12* (2013.01); *A23B 7/157* (2013.01); *A23B 7/10* (2013.01); *A23K 1/1609* (2013.01); *A23V 2002/00* (2013.01); *A23L 3/358* (2013.01); *A23L 1/0155* (2013.01)

(58) Field of Classification Search
None
See application file for complete search history.

(56) References Cited

U.S. PATENT DOCUMENTS

| 4,218,307 A | 8/1980 | McDaniel |
| 4,942,042 A | 7/1990 | Bhargava et al. |
| 5,165,946 A | 11/1992 | Taylor et al. |

(Continued)

FOREIGN PATENT DOCUMENTS

| CN | 1611450 A | 5/2005 |
| EP | 1747775 | 1/2007 |

(Continued)

OTHER PUBLICATIONS

Abstracting DE1999-2009819; Oct. 12, 2000; 5 pages.*

(Continued)

*Primary Examiner* — Ernst V Arnold
*Assistant Examiner* — Jianfeng Song
(74) *Attorney, Agent, or Firm* — Craig C. Conrad

(57) ABSTRACT

A preservative and additive for food and feed. One aspect of the invention concerns various acidified clays and minerals as food or feed additive to kill, or inhibit the growth of, harmful microorganisms and to inactivate mycotoxins, such as aflatoxins, present as contaminants in human foods and animal feeds. Another aspect of the present invention relates to a clay of hydrated sodium calcium aluminosilicate with relatively uniform particle size distribution.

10 Claims, 5 Drawing Sheets

(51) Int. Cl.
*A23L 3/358* (2006.01)
*A23L 1/015* (2006.01)

(56) References Cited

U.S. PATENT DOCUMENTS

| | | | |
|---|---|---|---|
| 5,178,832 A | 1/1993 | Phillips et al. | |
| 6,288,045 B1 * | 9/2001 | Kaufman | 514/63 |
| 6,867,233 B2 * | 3/2005 | Roselle et al. | 514/557 |
| 2004/0028678 A1 | 2/2004 | Schall et al. | |

FOREIGN PATENT DOCUMENTS

| | | |
|---|---|---|
| RU | 2329815 | 7/2008 |
| UA | 30790 | 11/2008 |
| WO | 00/48469 A2 | 8/2000 |
| WO | 2004/083252 A2 | 9/2004 |
| WO | 2008/013630 | 1/2008 |
| WO | 2008/013631 | 1/2008 |
| WO | 2009/087091 | 7/2009 |
| WO | 2010/012720 | 2/2010 |

OTHER PUBLICATIONS

Evans Afriyie-Gyawu (Safety and efficacy of Novasil clay as a dietary supplement to prevent aflatoxicosis;Dec. 2004).*
Ansel et al. (Pharmaceutical Dosage Froms and Drug Delivery Systems 1999, 7th Edition, Lipponcott Williams & Wilkins, pp. 90 and 301).*
Chinese Patent Office; Second Office Action (in Chinese); Chinese Patent Application No. 200680034245.X, 9 pages, Dec. 16, 2011.
Chinese Patent Office; Second Office Action (translation in English of first 3 pages); Chinese Patent Application No. 200680034245.X, 3 pages, Dec. 16, 2011.
Luo, Fangni; Feed Hygienics, Chemistry and Application Chemistry Publishing Center of Chemical Industry Press, Jun. 2003, 1st Edition, pp. 185-186.
Chinese Patent Office; Decision on Rejection (in Chinese); Chinese Patent Application No. 200680034245.X; Jul. 2, 2013.
Chinese Patent Office; Decision on Rejection (in English); Chinese Patent Application No. 200680034245.X; Jul. 2, 2013.
Chinese Patent Office; Third Office Action (in Chinese); Chinese Patent Application No. 200680034245.X, 10 pages, Sep. 29, 2012.
Chinese Patent Office; Third Office Action (in English); Chinese Patent Application No. 200680034245.X, 14 pages, Sep. 29, 2012.
Chinese Patent Office; First Office Action (in Chinese); Chinese Patent Application No. 200680034245.X, 15 pages, Apr. 19, 2011.
Chinese Patent Office; First Office Action (portion for which translation was available); Chinese Patent Application No. 200680034245.X, 6 pages, Apr. 19, 2011.
Bin Zaid M.R, et al; Attapulgite in the Treatment of Acute Diarrhoea: A Double-Blind Placebo-Controlled Study; J Diarrhoeal Dis Res, 13(1), 44-46, Mar. 1995.
Szajewska H., et al; Smectite in the Treatment of Acute Infectious Diarrhoea in Children; Alimentary Pharmacology & Therapeutics, 23, 217-227, 2006.
Evans, A.G., et al; Chronic Toxicological Evalution of Dietary Novasil Clay in Sprague-Dawley Rats; Food Additives and Contaminents, 22(3), 259-269, Mar. 2005.
Japanese Patent Office; Amendment and Note of Refutation; Japanese Patent Application No. 2009-518220, 12 pages, Mar. 25, 2013.
Chen et al; Observation of Effects of Smectite Powder in Treatment of Leukemia Patents With Chemotherapy-Induced Oral Mucositis, Nanfang Journal of Nursing, Online article accessed on Jan. 17, 2013, Retrieved from the internet: URL: http//en.cnki/com/cn/Article_en/CJFDTOTAL-NFHL200401023.htm, 1 page, (2004), Abstract only.
Dodd, et al: Radiation-Induced Mucositis: A Randomized Clinical Trial of Micronized Sucralfate Versus Salt and Soda Mouthwashes, Cancer Invest., vol. 21, No. 1, pp. 21-33 (2003) abstract only.
Russian Patent Office; International Search Report; PCT Application No. PCT/US2012/061206; Jan. 24, 2013.

Russian Patent Office; International Search Report; PCT Application No. PCT/US2012/061385; Feb. 28, 2013.
Keefe, et al: Updated Clinical Practice Guidelines for the Prevention and Treatment of Mucositis; Cancer, vol. 109, No. 5, pp. 820-831 (2007).
Lin, et al: Effect of Montmorillonite Powder Mixed With Iodine Glycerin on Chemotherapy-Induced Oral Mucositis, Journal of Nursing, Online article accessed on Jan. 17, 2013, Retrieved from the internet: URL: http//en.cnki/com/cn/Article_en/CJFDTOTAL-NFHL201006026.htm, 1 page, (2010), Abstract only.
Liu, S.; Curative Effect of Metronidazole Gargle and Smectite Powder on Oral Mucositis in Patients With Chronic Obstructive Pulmonary Disease; Modern Clinical Nursing; Online article accessed on Jan. 17, 2013, Retrieved from the internet: URL: http//en.cnki/com/cn/Article_en/CJFDTOTAL-XDLH200701015.htm, 1 page, (2007), Abstract only.
Yang, et al: Clinical Prevention and Control of Radioactive Oral Mucosa Injury by Montmorillonite Powder and Self Gargle Mouthwash, Journal of Clinical and Experimental Medicine, Online article accessed on Jan. 17, 2013, Retrieved from the Internet: URL: http//en.cnki/com/cn/Article_en/CJFDTOTAL-SYLC200902022.htm, 1 page, (2009), Abstract only.
Ye; Clinical Analysis of 71 Cases With Oral Mucositis Induced by Tumor Radiochemotherapy With Montmorillonite Powder; Journal of Beihua University (Natural Science); Online article accessed on Jan. 18, 2013, Retrieved from the Internet: URL: http//en.cnki/com/cn/Article_en/CJFDTOTAL-ZLYY200903012.htm, 1 page, (2009), Abstract only.
Chinese Patent Office; Response and Amended Claims in Chinese (clean and marked up); Chinese Patent Application No. 200680034245.X; Feb. 8, 2013.
Chinese Patent Office; Amended Claims in English; Chinese Patent Application No. 200680034245.X; Feb. 8, 2013.
Chinese Patent Office; Fourth Office Action in Chinese; Chinese Patent Application No. 200680034245.X; Mar. 1, 2013.
Chinese Patent Office; Fourth Office Action in English; Chinese Patent Application No. 200680034245.X; Mar. 1, 2013.
Chinese Patent Office; Third Office Action; Chinese Patent Application No. 200780031609.3; 11 pages; Feb. 20, 2013.
Chinese Patent Office; Response; Chinese Patent Application No. 200780023950.4; 9 pages; Mar. 14, 2013.
Taiwan Patent Office; Response; Taiwanese Patent Application No. 96123387; 32 pages; Mar. 1, 2013.
Japanese Patent Office; Response; Japanese Patent Application No. 2009-518,219; Jan. 24, 2013.
Allcock, H.R.; Introduction to Materials Chemistry; John Wiley & Sons, Inc.; 2008.
Chinese Patent Office; Office Action; Chinese Patent Application No. 200780023950.4; 11 pages; Dec. 4, 2012.
Chinese Patent Office; Response to Office Action; Chinese Patent Application No. 200680034245.X; Oct. 17, 2013.
Chinese Patent Office; English translation of Claims filed with Response to Office Action; Chinese Patent Application No. 200680034245.X; Oct. 17, 2013.
Canada Patent Office; Response to Office Action; Canadian Patent Application No. 2,659,072; Nov. 8, 2013.
Allcock, Harry R.; Aluminosilicate Clays and Related Minerals-Properties and Structure; Introduction to Materials Chemistry; 2008.
Groopman, et al.; Molecular Dosimetry in Rat Urine of Aflatoxin-N7-Guanine and Other Aflatoxin Metabolites by Multiple Monoclonal Antibody Affinity Chromatography and Immunoaffinity/High Performance Liquid Chromatography; Cancer Research, vol. 52, pp. 267-274, Jan. 15, 2992.
Rateau, et al; A Histological, Enzymatic and Water-Electrolyte Study of the Action of Smectite, A Mucoprotective Clay, on Experimental Infectious Diarrhoea in the Rabbit; Current Medical Research and Opinion; vol. 8, No. 4, pp. 233-241, 1982.
Remington's Pharmaceutical Sciences 17th Edition. Alfonso Gennaro editor, Mack Publishing Company Easton, Pennsylvania 18042, Chapter 68, Pharmaceutical Necessities, pp. 1278-1320, 1985.

(56) References Cited

OTHER PUBLICATIONS

Remington's Pharmaceutical Sciences 17th Edition. Alfonso Gennaro editor, Mack Publishing Company Easton, Pennsylvania 18042, Chapter 84, Solutions, Emulsions, Suspensions and Extractives, pp. 1492-1517, 1985.
Pimpukdee, et al; Aflatoxin-Induced Toxicity and Depletion of Hepatic Vitamin A in Young Broiler Chicks: Protection of Chicks in the Presence of Low Levels of Novasil Plus in the Diet; Poultry Science, vol. 83, 737-744, 2004.
Chinese Patent Office; Response to 4th Office Action (Claims and Argument in Chinese); Chinese Patent Application No. 200680034245.X, 14 pages, May 16, 2013.
Chinese Patent Office; Claims amended in response to 4th Office Action (in English); Chinese Patent Application No. 200680034245.X, 3 pages, May 16, 2013.
Indian Patent Office; Response to Office Action; Indian Patent Application No. 00188/MUMNP/2009; Apr. 23, 2013.
Canada Patent Office; Office Action; Canadian Patent Application No. 2,656,239; Apr. 30, 2013.
Australia Patent Office; Response to Office Action; Australian Patent Application No. 2007277428; Jun. 17, 2013.
Chinese Patent Office; Response to Office Action; Chinese Patent Application No. 200780031609.3; Jun. 20, 2013.
Russian Patent Office; International Search Report and Written Opinion; PCT Application No. PCT/US2012/061197; Mar. 14, 2013.
Canada Patent Office; Office Action; Canadian Patent Application No. 2,659,072; May 9, 2013.
Weems, J. B. (1903) "Chemistry of Clays," Iowa Geological Survey Annual Report: vol. 14: p. 319-346.
Paweena Numluk and Aphiruk Chaisena titled "Sulfuric Add and Ammonium Sulfate Leaching of Alumina from Lampang Clay." ISSN: 09734945; E-Journal of Chemistry, 2012, 9(3), 1364-1372.
Huber Engineered Materials. "Hydrex® is a synthetic magnesium aluminos ilicate manufactured by precipitating sodium silicate solution with a mixture of magnesium and aluminum sulfate." 2014, http://www.hubermaterials.com.
J. V. Smith, "Structural Classification of Zeolites," International Mineralogical Association, Papers, Third General Meeting, Paper 1, 1963.

* cited by examiner

| ANIMALS FED HSCAS | MYCOTOXIN IN FEED | HSCAS IN FEED (% and duration of exposure) | TOXICITY FROM HSCAS | MAJOR EFFECTS OF HSCAS CLAY REPORTED IN THE STUDY | REFERENCES |
|---|---|---|---|---|---|
| Chickens | Aflatoxins | (0.5; 28 d) | None | Growth inhibition diminished; gross hepatic changes prevented | Phillips et al. |
| Chickens | Aflatoxins | 0.5; 28 d) | None | Growth inhibition diminished; decreased mortality | Kubena et al. |
| Chickens | Aflatoxins | 0.1/0.5 (24 h) | None | Reduced bioavailability of Aflatoxin to the liver and blood in a dose-dependent manner | Davidson et al. |
| Chickens | Aflatoxins | 0.5/1.0 (21 d) | None | Growth inhibitory effects reduced | Araba & Wyatt |
| Chickens | Aflatoxins | 0 – 1.0 (21 d) | None | Feed conversions improved; growth inhibition diminished | Doerr |
| Chickens | Aflatoxins | 1.0 (21 d) | None | Growth inhibition completely prevented | Ledoux et al. |
| Chickens | Afl/Ochratoxin A | 0.5 (21 d) | None | Decreased growth inhibitory effects; no effect against ochratoxin| | Huff et al. |
| Chickens | Afl/Trichothecenes | 0.5 (21 d) | None | Diminished growth inhibition; no effect against trichothecenes | Kubena et al. |
| Chickens | Afl/Trichothecenes | 0.25/0.37/0.8 (21 d) | None | Diminished growth inhibition; no effect against trichothecenes | Kubena et al. |
| Chickens | None | 0.5/1.0 (14 d) | None | HSCAS did not impair phytate or inorganic phosphorous utilization | Chung & Baker |
| Chickens | None | 0.5/1.0 (14 d) | None | HSCAS did not impair utilization of riboflavin, vitamin A, or Mn; slight reduction of Zn | Chung et al. |
| Chickens | Aflatoxins | 0.125 – 0.5 (21) | None | Protected against vitamin A depletion in the livers of chicks exposed to aflatoxins | Pimpukdee et al. |
| Chickens | None (def. diets) | 0.5 (19 d) | None | Did not affect growth performance or tibial mineral concentrations of chicks | Southern et al. |
| Turkeys | Aflatoxins | 0.5 (21 d) | None | Decreased mortality | Kubena et al. |
| Turkeys | Aflatoxins | 0.5 (21 d) | None | Decreased urinary excretion of aflatoxin $M_1$ | Edrington et al. |
| Pigs | Aflatoxins | 0.5 | None | Decreased DNA adducts in the liver and reduced tissue residues of total aflatoxins | Beaver et al. |
| Pigs | Aflatoxins | 0.5 (42 d) | None | Diminished growth inhibition | Lindemann et al. |
| Pigs | Aflatoxins | 0.5/2.0 (28 d) | None | Decreased growth inhibition; prevention of serum effects and hepatic lesions | Harvey et al. |
| Pigs | Aflatoxins | 0.5/2.0 (28 d) | None | Diminished growth inhibition, hepatic lesions and immunosuppression | Harvey et al. |
| Pigs | Aflatoxins | 0.5 (35 d) | None | Growth inhibitory effects reduced | Schell et al. |
| Pigs | Ochratoxins | 1.0 | None | No significant effect | Bauer |
| Pigs | Trichothecenes | 0.5/1.0 | None | No significant effect | Patterson & Young |
| Dogs | Aflatoxins | 0.5 (48 h) | None | Significantly reduced the bioavailability of aflatoxins and excretion of $M_1$ in urine | Bingham et al. |
| Lambs | Aflatoxins | 2.0 (42 d) | None | Diminished growth inhibition and immunosuppression | Harvey et al. |
| Dairy Cows | Aflatoxins | 0.5/1.0 (28 d) | None | Reduction of aflatoxin $M_1$ in milk | Harvey et al. |
| Dairy Goats | Aflatoxins | 1.0/2.0/4.0 (12 d) | None | Reduction of aflatoxin M 1 in milk | Smith et al. |
| Rats | Aflatoxins | 0.5 (21 d) | None | Significant prevention of maternal and developmental toxicity | Mayura et al. |
| Rats | Aflatoxins | 0.5 (21) | None | Decreased growth inhibition in pregnant rats | Abdel-Wahhab et al. |
| Rats | Aflatoxins | 0.5 (48 h) | None | Decreased urinary excretion of aflatoxin metabolites ($M_1$ and $P_1$) | Sarr et al. |
| Rats | None (HSCAS only) | 0.25, 0.5, 1.0, 2.0 (6 months) | None | No adverse effects including vitamin utilization | Afriyie-Gyawu et al. |

Figure 2

Priority Metals & Dioxins in CAS

| Contaminant[a] (Metals and dioxins) | Conc. in CAS ug/g (ppm)[b] | Amt. in 3g dose of CAS (mg)[c] | JECFA- 1998 (mg/day)[d] |
|---|---|---|---|
| Co | 1.86 | 0.0056 | 0.016 |
| Cr | 9.70 | 0.0291 | 0.250 |
| Zn | 119.26 | 0.3578 | 10.000 |
| Mo | <2.00 | <0.006 | 0.110 |
| Se | 0.08 | 0.0002 | 0.057 |
| Ni | 4.00 | 0.012 | 0.300 |
| Hg | <0.10 | <0.0003 | 0.043 |
| Pb | 13.90 | 0.0417 | 0.210 |
| Cd | 0.20 | 0.0006 | 0.060 |
| As | 2.90 | 0.0087 | 0.310 |
| Dioxins (ppt) | ng/Kg (ppt) | pg/Kg BW-day | pg/Kg BW-day |
| TCDD, etc. | ND | --- | 2.300 |
| OCDD | 2.34 | 0.1003 | ? |

[a]Priority toxic metals based on EPA (Superfund) and Joint FAO/WHO Expert Commission on Food Additives (JECFA) criteria; [b]Concentrations in NS determined by neutron activation analysis and atomic absorption spectroscopy; [c]Derived dose of metal in 3g of CAS/day (assuming bioavailability of total concentration); [d]Tolerable human intake of metal from foods based on JECFA. ND = Non detectable. CAS = calcium aluminosilicate.

Figure 3

PRESERVATIVE AND ADDITIVE FOR FOOD AND FEED

This patent is the U.S. National Phase application of PCT/US2006/027581, filed on Jul. 17, 2006, which claims priority to U.S. provisional patent application 60/700,592 filed on Jul. 19, 2005.

BACKGROUND

This invention relates to a preservative and additive for food and feed. More specifically, one aspect of the invention concerns various acidified clays and minerals as food or feed additive to kill, or inhibit the growth of, harmful microorganisms and to inactivate mycotoxins, such as aflatoxins, present as contaminants in human foods and animal feeds. Another aspect of the present invention relates to a clay of hydrated sodium calcium aluminosilicate with relatively uniform particle size distribution.

Microorganism and aflatoxin contamination of human foods and animal feeds constitutes a serious threat to the health of humans and animals. Generally, microorganisms are considered to be any microscopic or ultramicroscopic animal, plant, bacterium, virus, etc., and aflatoxins (Afs) are harmful by-products of mold growth, which both are potentially fatal to humans and animals. Furthermore, such contamination in human food and animal feeds also can lead to severe economic losses.

Aflatoxins are produced by *Aspergillus flarus* or *A. parasiticus*. There are at least four naturally occurring aflatoxins, namely AfB1, AfB2, AfG1 and AfG2, as shown in FIG. 1. Many aflatoxins occur as natural contaminants in a variety of foods and feeds, such as corn, wheat, barley, beans, sorghum, moldy peanuts, mixed feed, and some coffee beans. They are also found as residues in liver, kidneys of pigs. Many of these aflatoxins have been known to be strong carcinogens, thus causing cancers, in humans and they are also capable of eliciting other toxic effects, such as teratogenesis.

Many strategies have been developed to inactivate aflatoxins in foods and feeds and the strategies give varying degrees of success. The strategies include processing the food and feed, biocontrol and microbial inactivation, chemical treatment after structural degradation, dietary modification of toxicity and absorption method to reduce bioavailable aflatoxin. One popular method is to add an non-nutritive adsorbents in contaminated feeds to inactivate the aflatoxin. Various adsorbents have been used, such as aluminas, zeolites, silicas, phyllosilicates, bentonite, activated charcoal, and montmorillonite. In particular, NovaSil Plus™ (hydrated sodium calcium aluminosilicate produced by Engelhard Corporation and available from Trouw Nutrition, USA) has been used to "absorb" and inactivate aflatoxin. See, U.S. Pat. No. 5,178,832 to Timothy D. Phillips, et al.; U.S. Pat. No. 5,165,946 to Dennis R. Taylor, et al.; and K. Pimpukdee, Feed & Livestock, pages 40-43, December 2003/January 2004, the content of each of which is hereby incorporated by reference.

As mentioned above, foods and feeds are very often contaminated with both harmful microorganisms and toxic aflatoxins. The methods currently available to solve these problems usually are those that will either kill harmful microorganisms or deactivate toxic aflatoxins, but not both. Thus, it is desirable to have a method that can both kill the harmful microorganisms and simultaneously deactivate toxic aflatoxins.

SUMMARY

The present invention is generally related to various acidified clays and minerals as food or feed additives used to kill, or inhibit the growth of, harmful microorganisms and to inactivate mycotoxins, such as aflatoxins, present as contaminants in human foods and animal feeds. The preferred clay includes hydrated sodium calcium aluminosilicate (NovaSil Plus™ produced by Engelhard Corporation and available from Trouw Nutrition, USA). The acids used include acidic solution of sparingly-soluble Group IIA complexes ("AGIIS"), organic acid adduct of AGIIS, and sulfuric acid having calcium sulfate dissolved therein. Another aspect of the present invention relates to a clay of hydrated sodium calcium aluminosilicate with relatively uniform distribution of particle size of less than about 80 microns.

A first aspect of the current invention is a preservative for food or feed. The preservative utilizes an effective amount of acidified clay capable of inactivating a mycotoxin and capable of killing or inhibiting the growth of a microorganism. The acidified clay comprises a clay blended with an acid or an acidic mixture. In a preferred embodiment, the weight ratio of the clay to the acid or the acidic mixture ranges from about 50:1 to about 1:5. The acid or the acidic mixture comprises a sparingly-soluble Group IIA complex ("AGIIS"), a highly acidic metalated organic acid ("HAMO"), a highly acidic metalated mixture of inorganic acid ("HAMMIA"), or a mixture thereof. The acid or the acidic mixture can be an adduct having AGIIS (e.g. a lactic acid, a propionic acid, or a mixture thereof). The preferred clay is an isolated low-sodium, calcium aluminosilicate clay that is substantially free from dioxins and priority toxic heavy metal contamination, and is capable of binding aflatoxins. In a preferred embodiment, the clay has a uniform particle size of smaller than about 80 microns and a chemical composition comprising: CaO above about 3.2%; MgO ranging from about 4.0 to about 5.4%; $Fe_2O_3$ ranging from about 5.4 to about 6.5%; $K_2O$ ranging from about 0.50 to about 0.90%; $Na_2O$ ranging from about 0.10 to about 0.30%; MnO ranging from about 0.01 to about 0.03%; $Al_2O_3$ ranging from about 14.8 to about 18.2%; and $SiO_2$ ranging from about 62.4 to about 73.5%; wherein, the chemical composition is given as weight percent.

A second aspect of the current invention comprises a method of preparing an acidified clay that is used as a preservative for food or feed. In a preferred embodiment, the method utilizes blending a clay (e.g. an isolated low-sodium, calcium aluminosilicate clay that is substantially free from dioxins and harmful or toxic heavy metal contamination, and is capable of binding aflatoxins), with an acid or an acidic mixture (e.g. the clay is mixed with acid in a weight ratio of the clay to the acid or the acidic mixture of from about 50:1 to about 1:5. The preferred acids, acidic mixtures, and clays are described below).

A third aspect of the current invention comprises a method of killing or inhibiting the growth of a microorganism and inactivating a mycotoxin in a food or feed by contacting the food or feed with an acidified clay. In a preferred embodiment, the clay (e.g. an isolated low-sodium, calcium aluminosilicate clay that is substantially free from dioxins and harmful or toxic heavy metal contamination, and is capable of binding aflatoxins), is mixed with an acid or an acidic mixture (e.g. the clay is mixed with acid in a weight ratio of the clay to the acid or the acidic mixture of from about 50:1 to about 1:5, and allowed to contact the food or feed. The preferred acids, acidic mixtures, and clays are formed into a useful packages that are capable of contacting a food item. For example, the acidified clay can be produced in a powdered form, a pellet form, or incorporated into a packaging material directly. In a preferred embodiment, the acidified clay was packaged into a soaker pad and allowed to contact a packaged meat product. Alternatively, a fine powder of the acidified clay (about 80 microns) can be mixed with grains, or incorporated into a packaging material used to wrap animal flesh (i.e. steaks, chicken, or pork).

BRIEF DESCRIPTION OF DRAWINGS

The following drawings form part of the present specification and are included to further demonstrate certain aspects of the present invention. The invention may be better understood by reference to one or more of these drawings in combination with the detailed description of specific embodiments presented herein.

FIG. 2 shows results of in vivo studies using HSCAS.

FIG. 3 shows how clay was selected for testing due to its GRAS status and its purity including priority trace metals and dioxin levels. using HSCAS.

DETAILED DESCRIPTION

Figure 1:
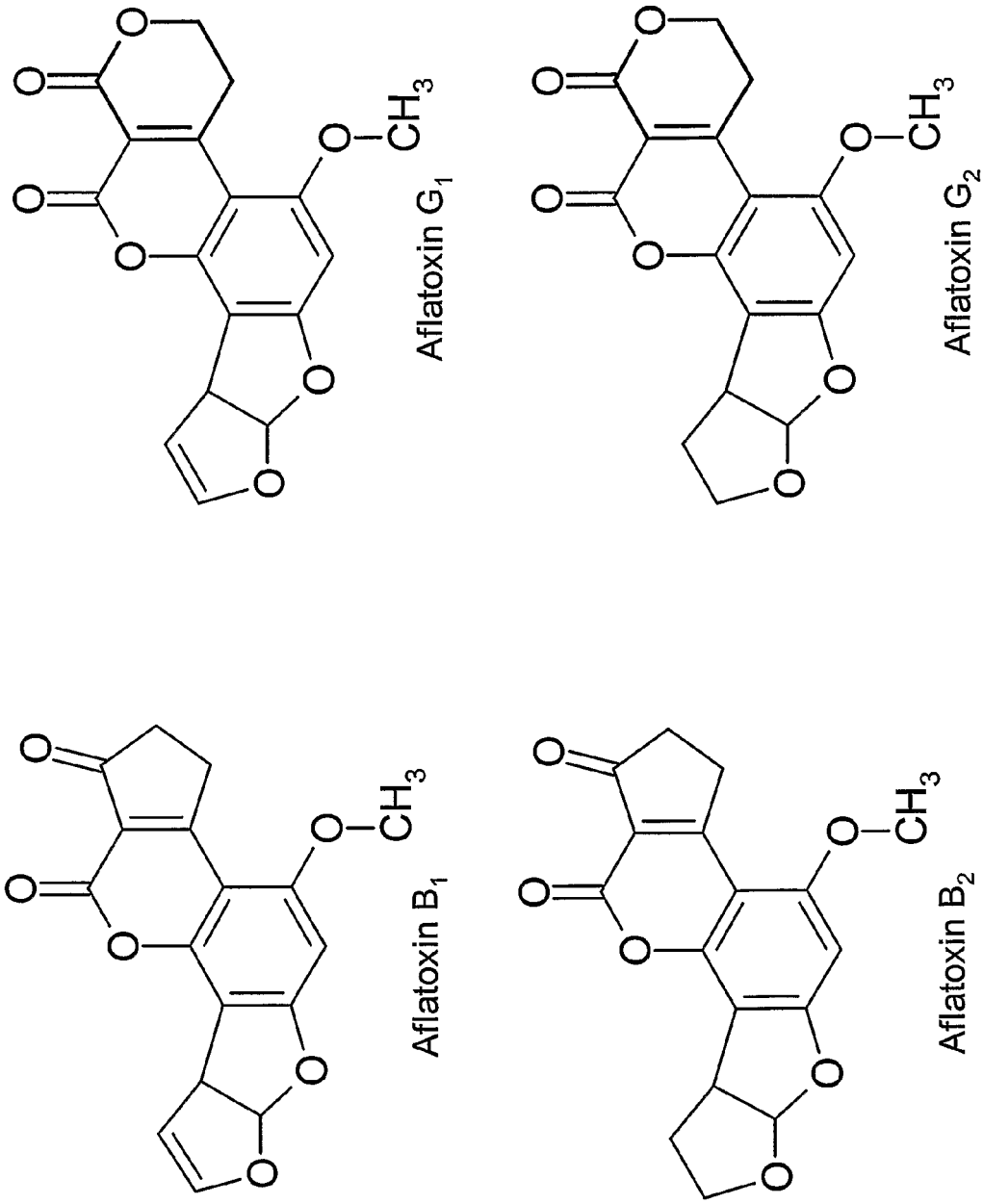
FIG. 1 shows the chemical structures of predominant aflatoxin congeners.

Before describing the present invention in detail, it is to be understood that this invention is not limited to particular compositions or composition delivery systems, which may vary. It is also to be understood that the terminology used herein is for the purpose of describing particular embodiments only, and is not intended to be limiting. In addition, before describing detailed embodiments of the invention, it will be useful to set forth definitions that are used in describing the invention. The definitions set forth apply only to the terms as they are used in this patent and may not be applicable to the same terms as used elsewhere, for example in scientific literature or other patents or applications including other applications by these inventors or assigned to common owners. Additionally, when examples are given, they are intended to be exemplary only and not to be restrictive.

It must be noted that, as used in this specification and the appended claims, the singular forms "a," "an" and "the" include plural referents unless the context clearly dictates otherwise. Thus, for example, reference to "a pharmacologically active agent" includes a mixture of two or more such compounds, reference to "a base" includes mixtures of two or more bases, and the like.

In describing and claiming the present invention, the following terminology will be used in accordance with the definitions set out below.

"Active agent," "pharmacologically active agent," "composition," and "drug" are used interchangeably herein to refer to compositions and drugs that are useful as a preservative and additive for food and feed. The terms also encompass pharmaceutically acceptable, pharmacologically active derivatives and analogs of such drugs, including, but not limited to, salts, esters, amides, prodrugs, active metabolites, inclusion complexes, analogs, and the like. Therefore, when the terms "active agent," "pharmacologically active agent", or "drug" are used, it is to be understood that applicants intend to include the active composition per se as well as pharmaceutically acceptable, pharmacologically active salts, esters, amides, pro-drugs, active metabolites, inclusion complexes, analogs, etc., which are collectively referred to herein as "pharmaceutically acceptable derivatives."

The present invention pertains to compositions and methods of preventing food spoilage by adding a preservative and additive for food and feed. Some of the toxins that occur in food are the aflatoxins, which are a group of carcinogenic mycotoxins produced primarily by *Aspergillus flavus* and *Aspergillus parasiticus* fungi and are often detected in foods and agricultural commodities. These compounds are heat stable and can survive a variety of food processing procedure; thus aflatoxins can occur as "unavoidable" contaminants of most foods and livestock feeds. Of four naturally occurring aflatoxins ($B_1$, $B_2$, $G_1$, and $G_2$), aflatoxin $B_1$ is the most toxic. In addition, several studies suggest that low-level exposure to aflatoxins may cause suppression of the immune system and increased susceptibility to disease.

One aspect of the present invention pertains to various acidified clays and minerals as a preservative and additive for food and feed. These acidified clays and minerals can function as a food or feed additive that kills, or inhibits the growth of, harmful microorganisms and simultaneously inactivates mycotoxins, such as aflatoxins, present as contaminants in human foods and animal feeds. The clay is an adsorbent having structure-selective affinities to various mycotoxins, such as aflatoxins, thus inactivating the mycotoxins present in human foods and animal feeds. Although not wanting to be bound by theory, the adsorbed or absorbed acid is believed to be available from the acidified clay to kill harmful microorganisms present as contaminants in human foods and animal feeds.

The clay or mineral suitable for this invention include montmorillonite clay, phyllosilicate, Florisil®, bayerite, pseudoboehmite, alumina, silica gel, aluminum oxides, gibbisite, boehmite, and bauxite. The preferred clay used includes hydrated sodium calcium aluminosilicate ("HSCAS" clay commercially available as NovaSil Plus™ which is produced by Engelhard Corporation and available from Trouw Nutrition, USA).

Another aspect of the present invention relates to a clay of hydrated sodium calcium aluminosilicate, such as NovaSil Plus™, with relatively uniform distribution of particle size of less than about 80 microns. Such clay with relatively uniform small particle sizes is particularly suitable for uniform or homogeneous mixing. This clay with uniform distribution of particle size can be obtained, for example, by sifting hydrated sodium calcium aluminosilicate with a 325 mesh screen to separate and eliminate particles having sizes larger than about 45 microns.

The appearance of NovaSil Plus™ is off white to tan colored and is a free flowing powder. The free moisture content is about 9%. The loose bulk density is 0.64 g/cc; the packed bulk density is about 0.80 g/cc; and the particle size distribution is about 5% of +100 mesh, 18% of +200 mesh, and 60% of −325 mesh. Chemical analysis showed that % CaO is between 3.2-4.8; % MgO is between 4.0-5.4; % $Fe_2O_3$ is between 5.4-6.5; % $K_2O$ is between 0.50-0.90; % $Na_2O$ is between 0.10-0.30; % MnO is between 0.01-0.03; % $Al_2O_3$ is between 14.8-18.2; and % $SiO_2$ is between 62.4-73.5. Content of traces of heavy metals is as follows: Pb, 6.0-6.5 ppm; As, 0.5-0.7 ppm; Cd, 0.2-0.4 ppm; Cr, 5.5-6.0 ppm, and Hg, less than 0.1 ppm. The clay is substantially free from dioxins (dioxin as used here refers to the toxic contaminant 2,3,7,8-tetrachlorodibenzodioxin ("TCDD") which is used as an index of the presence of dioxins in food ingredient) in NovaSil Plus above the detection limit of 0.33 parts per trillion ("ppt").

The acids, or acidic mixtures, used include acidic solution of sparingly-soluble Group IIA complexes ("AGIIS"); adduct having AGIIS, preferably it is the organic acid adduct wherein the organic acid can be propionic acid, lactic acid, or both; sulfuric acid having calcium sulfate dissolved therein, the sulfuric acid can be concentrated sulfuric acid; highly acidic metalated organic acid ("HAMO"); highly acidic metalated mixture of inorganic acid ("HAMMIA"), and a mixture thereof.

A first acid, or acidic mixture, is AGIIS. The acidic, or low pH, solution of sparingly-soluble Group IIA complexes ("AGIIS") may have a suspension of very fine particles, and the term "low pH" means the pH is below 7, in the acidic region. The AGIIS has a certain acid normality but does not have the same dehydrating behavior as a saturated calcium sulfate in sulfuric acid having the same normality. In other words, the AGIIS has a certain acid normality but does not char sucrose as readily as does a saturated solution of calcium sulfate in sulfuric acid having the same normality. Further, the AGIIS has low volatility at room temperature and pressure. It is less corrosive to a human skin than sulfuric acid saturated with calcium sulfate having the same acid normality. Not intending to be bound by the theory, it is believed that one embodiment of AGIIS comprises near-saturated, saturated, or super-saturated calcium, sulfate anions or variations thereof, and/or complex ions containing calcium, sulfates, and/or variations thereof.

The term "complex," as used herein, denotes a composition wherein individual constituents are associated. "Associated" means constituents are bound to one another either covalently or non-covalently, the latter as a result of hydrogen bonding or other inter-molecular forces. The constituents may be present in ionic, non-ionic, hydrated or other forms.

The AGIIS can be prepared in several ways. Some of the methods involve the use of Group IA hydroxide but some of syntheses are devoid of the use of any added Group IA hydroxide, although it is possible that a small amount of Group IA metal may be present as "impurities." The preferred way of manufacturing AGIIS is not to add Group IA hydroxide to the mixture. As the phrase implies, AGIIS is highly acidic, ionic, with a pH of below about 7, preferably below about 2.

The preferred acidic mixtures for this invention include: (1) "Acid Adduct I," which is a mixture containing lactic acid (88% W/V); 5N AGIIS; disodium phosphate; water in a % W/W (percent composition may vary by +/−5%) ratio of 36.8:9.9:2.0:51.3, and (2) "Acid Adduct II," which is a mixture containing lactic acid (88% WNV); propionic acid (99% WNV); 5N AGIIS; disodium phosphate; water in a % W/W (percent composition may vary by +/−5%) ratio of 35.9:29.1: 8.5:2.2:24.3.

The acidified clay is prepared by slowing blending a preferred acidic mixture with a preferred clay (See Examples). The weight ratio of the acid to the clay can vary widely, depending on the type of clay and acid used. The normal ratio can vary from 50:1 to 1:5. Preferably, the weight ratio of the acid to the clay ranges from 1:1 to 1:1.25. In some instances, the resultant acidified clay appears as lumps of solid, which can then be ground to powder form. After the completion of blending, the resultant acidified clay is allowed to dry, preferably at ambient temperature.

The acidified clays should preferably be in the form of substantially free flowing powder, and of relatively uniform fine or small particle sizes, and hence capable of being uniformly applied to, and mixed with, foods or feeds. Thus, the clay, because of its structure, has selective affinities to various mycotoxins, such as aflatoxins. The acid used to acidify the acidified clay should not significantly alter or destroy the structure of the clay to cause the clay to lose its selective affinities to various mycotoxins. The relatively fine particle size clay also function as a carrier, or medium, for the acid absorbed or adsorbed therein.

One further aspect of the present invention pertains to a method employing an acidified clay to kill, or inhibit the growth of, harmful microorganisms as well as to inactivate mycotoxins, such as aflatoxins, commonly found in animal feeds and human foods. Here an effective amount (in that the amount is sufficient to exhert its anti-microbial or anti-toxin properties) of the acidified clay is allowed to contact (such as by blending, mixing, or spraying) the human food or animal feed. The clay is functioning like a carrier or medium of the acids or the acidic mixtures.

Although not wanting to be bound by theory, no absolute methods are available for totally eliminating mycotoxin contamination in various agricultural commodities; however, acidic-clay-based approaches do offer a economical and practical solution for reducing dietary exposure to aflatoxins and microbes. The compositions and methods of use for acidic-clay to prevent and microbial growth and aflatoxin contamination in food or feed is described in the examples below:

EXAMPLES

The following examples are provided to further illustrate this invention and the manner in which it may be carried out. It will be understood, however, that the specific details given in the examples have been chosen for purposes of illustration only and not be construed as limiting the invention.

Example 1

Acids

A preferred method of preparing AGIIS involves mixing a mineral acid with a Group IIA hydroxide, or with a Group IIA salt of a dibasic acid, or with a mixture of the two Group IIA materials. In the mixing, a salt of Group IIA is also formed. Preferably, the starting Group IIA material or materials selected will give rise to, and form, the Group IIA salt or salts that are sparingly soluble in water. The preferred mineral acid is sulfuric acid, the preferred Group IIA hydroxide is calcium hydroxide, and the prefer Group IIA salt of a dibasic acid is calcium sulfate. Other examples of Group IIA salt include calcium oxide, calcium carbonate, and "calcium bicarbonate."

Thus, for example, AGIIS can be prepared by mixing or blending starting materials given in one of the following scheme with good reproducibility:
 (1) $H_2SO_4$ and $Ca(OH)_2$;
 (2) $H_2SO_4$, $Ca(OH)_2$, and $CaCO_3$;
 (3) $H_2SO_4$, $Ca(OH)_2$, $CaCO_3$, and $CO_2$ (gas);
 (4) $H_2SO_4$, $CaCO_3$, and $Ca(OH)_2$;
 (5) $H_2SO_4$, $Ca(OH)_2$, and $CaSO_4$;
 (6) $H_2SO_4$, $CaSO_4$, $CaCO_3$, and $Ca(OH)_2$;
 (7) $H_2SO_4$, $CaSO_4$, $CaCO_3$, and $CO_2$ (gas); and
 (8) $H_2SO_4$, $CaSO_4$, $CaCO_3$, $CO_2$ (gas), and $Ca(OH)_2$.

Preferably, AGIIS is prepared by mixing calcium hydroxide with concentrated sulfuric acid, with or without an optional Group IIA salt of a dibasic acid (such as calcium sulfate) added to the sulfuric acid. The optional calcium sulfate can be added to the concentrated sulfuric acid prior to the introduction of calcium hydroxide into the blending mixture. The addition of calcium sulfate to the concentrated sulfuric acid appears to reduce the amount of calcium hydroxide needed for the preparation of AGIIS. Other optional reactants include calcium carbonate and gaseous carbon dioxide being bubbled into the mixture. Regardless of the use of any optional reactants, it was found that the use of calcium hydroxide is desirable.

One preferred method of preparing AGIIS can be described briefly as: Concentrated sulfuric acid is added to chilled water (8°-12° C.) in the reaction vessel, then, with stirring, calcium sulfate is added to the acid in chilled water to give a mixture. Temperature control is paramount to this process. To this stirring mixture is then added a slurry of calcium hydroxide in water. The solid formed from the mixture is then removed. This method involves the use of sulfuric acid, calcium sulfate, and calcium hydroxide, and it has several unexpected advantages. Firstly, this reaction is not violent and is not exceedingly exothermic. Besides being easy to control and easy to reproduce, this reaction uses ingredients each of which has been reviewed by the U.S. Food and Drug Administration ("U.S. FDA") and determined to be "generally recognized as safe" ("GRAS"). As such, each of these ingredients can be added directly to food, subject, of course, to certain limitations. Under proper concentration, each of these ingredients can be used as processing aids and in food contact applications. Their use is limited only by product suitability and Good Manufacturing Practices ("GMP"). The AGIIS so prepared is thus safe for animal consumption, safe for processing aids, and safe in food contact applications. Further, the AGIIS reduces biological contaminants in not only inhibiting the growth of, and killing, microorganisms but also destroying the toxins formed and generated by the microorganisms. The AGIIS formed can also preserve, or extend the shelf-life of, consumable products, be they plant, animal, pharmaceutical, or biological products. It also preserves or improves the organoleptic quality of a beverage, a plant product or an animal product. It also possesses certain healing and therapeutic properties.

The sulfuric acid used is usually 95-98% FCC Grade (about 35-37 N). The amount of concentrated sulfuric acid can range from about 0.05 M to about 18 M (about 0.1 N to about 36 N), preferably from about 1 M to about 5 M. It is application specific. The term "M" used denotes molar or moles per liter.

Normally, a slurry of finely ground calcium hydroxide suspended in water (about 50% of w/v) is the preferred way of introducing the calcium hydroxide, in increments, into a stirring solution of sulfuric acid, with or without the presence of calcium sulfate. Ordinarily, the reaction is carried out below 40° C., preferably below room temperature, and more preferably below 10° C. The time to add calcium hydroxide can range from about 1 hour to about 4 hours. The agitation speed can vary from about 600 to about 700 rpm or higher. After the mixing, the mixture is filtered through a 5 micron filter. The filtrate is then allowed to sit overnight and the fine sediment is removed by decantation.

The calcium hydroxide used is usually FCC Grade of about 98% purity. For every mole of concentrated acid, such as sulfuric acid, the amount, in mole, of calcium hydroxide used is application specific and ranges from about 0.1 to about 1.

The phosphoric acid used is usually from JT Baker of about 85-88%.

The calcium monohydrogen phosphate is usually of 98-99%; and the calcium phosphate ("the tribasic") is obtained from Mallinckrodt. Other phosphate salts used are all of reagent grade.

The optional calcium carbonate is normally FCC Grade having a purity of about 98%. When used with calcium hydroxide as described above, for every mole of concentrated acid, such as sulfuric acid, the amount, in mole, of calcium carbonate ranges from about 0.001 to about 0.2, depending on the amount of calcium hydroxide used.

The optional carbon dioxide is usually bubbled into the slurry containing calcium hydroxide at a speed of from about 1 to about 3 pounds pressure. The carbon dioxide is bubbled into the slurry for a period of from about 1 to about 3 hours. The slurry is then added to the reaction vessel containing the concentrated sulfuric acid.

Another optional ingredient is calcium sulfate, a Group IIA salt of a dibasic acid. Normally, dihydrated calcium sulfate is used. As used in this application, the phrase "calcium sulfate," or the formula "$CaSO_4$," means either anhydrous or hydrated calcium sulfate. The purity of calcium sulfate (dihydrate) used is usually 95-98% FCC Grade. The amount of calcium sulfate, in moles per liter of concentrated sulfuric acid ranges from about 0.005 to about 0.15, preferably from about 0.007 to about 0.07, and more preferably from about 0.007 to about 0.04. It is application specific.

In the event that $CaSO_4$ is used for the reaction by adding it to the solution of concentrated $H_2SO_4$, the amount of $CaSO_4$, in grams per liter of solution based on final volume, has the following relationship:

| Final AGIIS Acid Normality (N) | Amount of $CaSO_4$ in g/l |
| --- | --- |
| 1-5 | 5 |
| 6-10 | 4 |
| 11-15 | 3 |
| 16-20 | 2 |
| 21-36 | 1 |

The AGIIS obtained could have an acid normality range of from about 0.05 to about 31; the pH of lower than 0; boiling point of from about 100 to about 106° C.; freezing point of from about −8° C. to about 0° C.

AGIIS obtained from using the reaction of $H_2SO_4$/$Ca(OH)_2$/$CaSO_4$ had the following analyses (average):

AGIIS with Final Acid Normality of 1.2 N pH of −0.08

$H_3O^+$, 2.22%; Ca, 602 ppm; $SO_4$, 73560 ppm; K, 1.36 ppb; impurities of 19.68 ppm, and neither Na nor Mg was detected.

AGIIS with Final Acid Normality of about 29 N pH of about −1.46

$H_3O^+$, 30.68%; Ca, 52.9 ppm; $SO_4$, 1422160 ppm; K, 38.02 ppb; and neither Na nor Mg was detected.

Aqueous solutions of other alkalis or bases, such as Group IA hydroxide solution or slurry and Group IIA hydroxide solution or slurry can be used. Groups IA and IIA refer to the two Groups in the periodical table. The use of Group IIA hydroxide is preferred. Preferably, the salts formed from using Group IIA hydroxides in the reaction are sparingly soluble in water. It is also preferable to use only Group IIA hydroxide as the base without the addition of Group IA hydroxide.

After the reaction, the resultant concentrated acidic solution with a relatively low pH value, typically below pH 1, can then be diluted with de-ionized water to the desired pH value, such as pH of about 1 or about 1.8.

As discussed above, AGIIS has relatively less dehydrating properties (such as charring sucrose) as compared to the saturated solution of $CaSO_4$ in the same concentration of $H_2SO_4$. Further, the stability and non-corrosive nature of the AGIIS of the present invention can be illustrated by the fact that a person can put his or her hand into this solution with a pH of less than 0.5 and, yet, his or her hand suffers no irritation, and no injury. If, on the other hand, one places his or her hand into a solution of sulfuric acid of pH of less than 0.5, an irritation would occur within a relatively short span of time. A solution of 28 N of sulfuric acid saturated with calcium sulfate will cause chemical burn to a human skin after a few seconds of contact. In contrast, AGIIS solution of the same normality would not cause chemical burn to a human skin even after in contact for 5 minutes. The AGIIS does not seem to be corrosive when being brought in contact with the environmental protective covering of plants (cuticle) and animals (skin). AGIIS has low volatility at room temperature and pressure. Even as concentrated as 29 N, the AGIIS has no odor, does not give off fumes in the air, and is not irritating to a human nose when one smells this concentrated solution.

A second acid, or acidic mixture, is an adduct having AGIIS, which comprises AGIIS and one more additives. The "additive" of the present invention appears to enhance, and also appears to be synergistic to, the effectiveness of the acidic composition of the present invention. Examples of the additive include alcohol, organic acid, periodic acid, and surfactant. The amount of additive added to the AGIIS varies depending on the desired final weight percent of the additive in the final adduct composition. The weight percent of additive needed for the adduct composition of the present invention can vary from about 0.01 to about 99.99, based on the total weight of the final adduct composition. The alcohol additive preferred for the present invention includes methanol, ethanol, 1-propanol, 2-propanol, and other lower alkyl alcohols.

Organic acid additive of the present invention includes carboxylic acid. A carboxylic acid is an organic compound containing the —COOH group, i.e., a carbonyl attached to a hydroxyl group. Preferred organic acids for the present invention include lactic acid, acetic acid, propionic acid, oxalic acid, sorbic acid, butyric acid, benzoic acid, glycolic acid, peracetic acid, and a mixture thereof.

A surfactant for the present invention is a surface-active agent. It is usually an organic compound consisting of two parts: One, a hydrophobic portion, usually including a long hydrocarbon chain; and two, a hydrophilic portion which renders the compound sufficiently soluble or dispersible in water or another polar solvent. Surfactants are usually classified into: (1) anionic, where the hydrophilic moiety of the molecule carries a negative charge; (2) cationic, where this moiety of the molecule carries a positive charge; and (3) non-ionic, which do not dissociate, but commonly derive their hydrophilic moiety from polyhydroxy or polyethoxy structures. Other surfactants include ampholytic and zwitterionic surfactants. A preferred surfactant for the present invention includes polysorbates (Tween 80).

Unless otherwise defined, the amount of each ingredient or component of the present invention is based on the weight percent of the final composition, usually the concentrate before further dilution to achieve the desired pH of about 1.8. The AGIIS having a pH of about 1.8 is usually further diluted with water before applying to an animal product or a plant product.

A third acid, or acidic mixture, is highly acidic metalated organic acid ("HAMO"). The HAMO composition may have a suspension of very fine particles, and it has a monovalent or a polyvalent cation, an organic acid, and an anion of a regenerating acid, such as the anion of a strong oxyacid. The term "highly acidic" means the pH is in the acidic region, below at least about 4. HAMO of the present invention is less corrosive to a ferrous metal than a solution of a mineral acid having the same acidic pH value as that of the acidic composition. HAMO is also more biocidal than a mixture of the organic acid and a metal salt of the organic acid which mixture having the same acid normality value as that of the acidic composition.

Broadly, one way HAMO can be prepared is by mixing the following ingredients: (1) at least one regenerating acid; (2) at least one metal base; and (3) at least one organic acid, wherein the equivalent amount of the regenerating acid is in excess of the equivalent amount of the metal base. The equivalent amount of the metal base should be about equal to that of the organic acid. Instead of using a metal base and an organic acid, a metal salt of the organic acid can be used in place of the metal base and the organic acid. The insoluble solid is removed by any conventional method, such as sedimentation, filtration, or centrifugation.

Generally, HAMO can be prepared by blending or mixing the necessary ingredients in at least the following manners:
1. Regenerating acid+(metal base+organic acid);
2. Regenerating acid+(metal base+salt of organic acid);
3. (Regenerating acid+salt of organic acid)+base; and
4. Regenerating acid+salt of organic acid.

The parenthesis in the above scheme denotes "pre-mixing" the two ingredients recited in the parenthesis. Normally, the regenerating acid is added last to generate the HAMO. Although each of the reagents is listed as a single reagent, optionally, more than one single reagent, such as more than one regenerating acid or organic acid, can be used in the current invention. The number of equivalents of the regenerating acid must be larger than the number of equivalents of the metal base, or those of the metal salt of the organic acid. When the organic acid is an amino acid, which, by definition contains at least one amino group, then the number of equivalents of the regenerating acid must be larger than the total number of equivalents of the metal base, or metal salt of the organic acid, and the "base" amino group of the amino acid. Thus, the resultant highly acidic metalated organic acid is different from, and not, a buffer.

As used herein, a regenerating acid is an acid that will "re-generate" the organic acid from its salt. Examples of a regenerating acid include a strong binary acid, a strong oxyacid, and others. A binary acid is an acid in which protons are directly bound to a central atom, that is (central atom)-H. Examples of a binary acid include HF, HCl, HBr, $H_1$, $H_2S$ and $HN_3$. An oxyacid is an acid in which the acidic protons are bound to oxygen, which in turn is bound to a central atom, that is (central atom)-O—H. Examples of oxyacid include acids having Cl, Br, Cr, As, Ge, Te, P, B, As, I, S, Se, Sn, Te, N, Mo, W, or Mn as the central atom. Some examples include $H_2SO_4$, $HNO_3$, $H_2SeO_4$, $HClO_4$, $H_3PO_4$, and $HMnO_4$. Some of the acids (e.g. $HMnO_4$) cannot actually be isolated as such, but occur only in the form of their dilute solutions, anions, and salts. A "strong oxyacid" is an oxyacid which at a concentration of 1 molar in water gives a concentration of $H_3O^+$ greater than about 0.8 molar. The regenerating acid can also be an acidic solution of sparingly-soluble Group IIA complexes ("AGIIS").

A fourth acid, or acidic mixture, is a highly acidic metalated mixture of inorganic acids ("HAMMIA"). The composition has an acidic pH, and can be isolated from a mixture prepared by mixing ingredients comprising a salt of phosphoric acid, and a preformed, or in-situ generated, solution or suspension of an acidic sparingly-soluble Group IIA complex ("AGIIS"), wherein the solution or suspension of AGIIS is in an amount sufficient to render the acidic pH of the composition to be less than about 2.

Clay

Several strategies are available for managing aflatoxins in agricultural commodities, the simplest of which requires isolation and destruction of the contaminated source. This approach however, is often not practical since alternative food supplies may not be available, or replacement supplies may not be economically affordable. One of the most promising and well-studied approaches for prevention of aflatoxicoses in livestock involves the incorporation of clays or various "binding agents" into diets contaminated with these toxins. The additives reduce the bioavailability of the toxin in the gastrointestinal tract; that is, they serve as sequestering agents (enterosorbents) of the toxins, thus reducing uptake and distribution to the blood and target organs.

Adsorbent clay minerals have been reported to bind aflatoxin $B_1$ in liquids. In the first enterosorbent study with aflatoxins, a calcium montmorillonite clay that is commonly used as an anti-caking additive for animal feeds has been shown to significantly sorbs aflatoxin $B_1$ with high affinity and high capacity in aqueous solutions and to protect broiler and Leghorn chicks from the toxic effects of 7,500 ppb aflatoxins in the diet. Since this initial study, calcium montmorillonite clay and other similar montmorillonite clays have been reported to diminish the toxic effects of aflatoxins in a variety of young animals including rodents, chicks, turkey poults, ducklings, lambs, mink and pigs. Clay in the diet has also been shown to diminish levels of aflatoxin $M_1$ in milk. More recently, urinary biomarkers of $AfB_1$ exposure in dogs were reduced by the inclusion of calcium montmorillonite clay. Thus, CAS at 0.5% (w/w) in the feed protected against the adverse effects of 7,500 ppb aflatoxins in the same feed. This high aflatoxin level would not normally be found as a contaminant of food or feed and (as such) represents a "worst case scenario." Aflatoxin protection can be shown at levels as low as 0.25% (w/w) in the diet. Extrapolating to the human, an approximate 3 g dose of CAS in a capsule would approximate the 0.25% level in food based on food intake data in Ghana and a body weight of 70 Kg.

GRAS Status and Safety Studies for In Vivo Use of Clay.

One of ordinary skill in the art would be aware that scientific publications support the use of calcium montmorillonite clay as an aflatoxin binding agent in animal feeds. A compilation of various in vivo studies involving calcium montmorillonite clay in multiple animal species is described herein (see FIG. 2). For example, hydrated sodium calcium aluminosilicate is generally recognized as safe for use in feeds at a level not exceeding 2 percent in accordance with good manufacturing or feeding practice.

In animal studies with calcium montmorillonite clay, no adverse effects from clay treatment, at levels up to 2.0% in the diet, have been reported. In recent studies in rodents, montmorillonite clays were evaluated for potential toxicity and trace metal bioavailability in pregnant Sprague-Dawley rats throughout the period of gestation following high level exposure in the diet (2.0% w/w). Clays were supplemented in the balanced diet of Sprague-Dawley rats during pregnancy at a level of 2.0% (w/w). Evaluations of toxicity were performed on gestation day 16 and included maternal body weights, maternal feed intakes, litter weights, in addition to embryonic resorptions. Liver and, kidneys, tibia, brain, uterus, pooled placental, and pooled embryonic mass were collected and weighed. Tissue were lyophilized and neutron activation analysis (NAA) was then performed. Elements considered by NAA included: Al, Br, Ca, Ce, Co, Cr, Cs, Cu, Dy, Eu, Fe, Hf, K, La, Lu, Mg, Mn, Na, Nd, Ni, Rb, S, Sb, Sc, Se, Sm, Sr, Ta, Th, Te, Th, Ti, Tl, U, V, Yb, Zn, and Zr. Inductively coupled plasma-mass spectroscopy further confined that Al was below detection limits (0.5 ppm) in the brain, indicating no significant bioavailability of this metal from clay interactions in the GI tract. Animals supplemented with either clay were similar to controls with respect to toxicity evaluations and metal analysis, with the exception of decreased brain Rb following clay supplementation. Overall, the results of this study suggest that neither clay at high dietary concentrations, result in overt toxicity or influence mineral uptake or utilization in the pregnant rat. In some embodiments, clay was selected for testing due to its GRAS status and its purity priority trace metals and dioxin levels, see FIG. 3.

Other studies in rodents and subjects have confirmed the safety calcium montmorillonite clay for application in human diets. In the rodent study, rats were fed rations containing about 0, 0.25, 0.5, 1.0, and 2.0% levels of calcium montmorillonite clay. Body weights, body weight gain, organ weights, histopathology, plasma biochemistry, serum vitamins A and E and micronutrients (Fe and Zn) were measured, standardized and compared to determine toxicity and any interactions of clay with critical nutrients at the end of the study. After 6 months exposure to clay, no morbidity or mortality was observed among treatment groups. There were no changes in the major organs, serum biochemistry or micronutrient levels. The ratios of organ weight to final body weight for the liver, kidneys, lungs, heart, brain, spleen, and tibia among the treatment groups in each sex were not significantly different histopathological analysis of the liver and kidneys indicated no differences between controls and clay treatments. These results suggest that inclusion of clay at levels less than 2.0% (w/w) in the diet should not result in overt toxicity and can be used safely to reduce exposure aflatoxins in the gastrointestinal tract. In the human study, Calcium montmorillonite clay was initially tested for trace metals and dioxin content in order to confirm the composition of matter and ensure low levels of contamination.

Calcium montmorillonite clay was then heat sterilized and packed into capsules for use in the study. The study design was based on 2 treatment groups: 1) low dose—3×500 mg capsules×3 times/day for a total of 2 weeks, and 2) high dose—3×1,000 mg capsules×3 times/day for a total of 2 weeks. The 2-week trial consisted of 50 healthy adults, age 22-40 selected by initial physical exams, laboratory analysis of biological fluids and questionnaire. One of ordinary skill in the art would be able to make capsules that are modified from the above description, that varied in dose, see Remington's Pharmaceutical Sciences $17^{th}$ Edition. Participants were then given clay capsules before meals with a bottle of spring water. Medical personnel were onsite to monitor any complaints or adverse effects. Blood and urine samples were taken at the end of the 2 week period and laboratory analysis and physical examinations were administered again. Any adverse events were reported according to NIH guidelines. Compliance with the dosing protocol reached 100% over the two-week study period. Analysis of clinical and biochemical data for side effects monitoring, blood, and urine parameters for liver and kidney function did not show any specific adverse effects.

Mode of Action and Mechanistic Studies.

Several in vitro studies have assessed the sorption of aflatoxins onto the surface of hydrated sodium calcium aluminosilicate clay (HSCAS). HSCAS, in aqueous solution, has been shown to tightly and preferentially sorb $AfB_1$ and similar analogs of aflatoxin $B_1$ ($AfB_1$) that contain an intact β-dicarbonyl system in their molecular structure. Isothermal analysis of $AfB_1$ sorption to HSCAS indicated both high affinity and high capacity characteristics and also suggested that different sites and/or mechanisms of action may be involved in $AfB_1$ sorption at clay surfaces. The enthalpy of $AfB_1$ sorption (near ~40 kJ/mol) showed some variation, suggesting multiple sites on HSCAS with dissimilar thermodynamic properties. These findings indicate that multiple sites on the surface of HSCASs may act to chemisorb $AfB_1$ and that the optimal orientation of the $AfB_1$ molecule is most likely planar on interlayer clay surfaces. Functional groups on aflatoxin analogs may sterically hinder sorption at the surface of HSCAS or may block sorption by interacting across the interlayer region. Other mechanisms of $AfB_1$ sorption to HSCAS surfaces may involve the potential chelation of predominant interlayer cations such as calcium and various other edge-site metals.

Ingredient Description and Profile.

Calcium aluminosilicate clay (CAS) has a different composition from hydrated sodium calcium aluminosilicate (HSCAS) clay, which has a dark tan color. The CAS has the appearance of an offwhite to gray-greenish colored free flowing powder. The CAS is odorless having a specific gravity of about 2.4. The isolated CAS is negligibly soluble in water and has a pH in the range of about 5-9. Due to the silica and aluminum silicate components, the isolated CAS may have some adverse effects if dry particles are inhaled, but no adverse health effects are suspected from ingestion. The typical values are as follows:

Typical Physical Properties:

| Free Moisture (LOD) | 9% |
|---|---|
| Loose Bulk Density | 0.64 g/cc 40 lbs/ft 3 |
| Packed Bulk Density | 0.80 g/cc 50 lbs/ft 3 |
| Particle Size Distribution: | 5% + 100 mesh |
| | 18% + 200 mesh |
| | 60% + 325 mesh |

Typical Chemical Analysis:

| Chemical Analysis by | % CaO 3.2-4.8 |
|---|---|
| X-Ray Fractionation (XRF) | % MgO 4.0-5.4 |
| Spectroscopy (weight %): | % $Fe_2O_3$ 5.4-6.5 |
| | % $K_2O$ 0.50-0.90 |
| | % $Na_2O$ 0.10-0.30 |
| | % MnO 0.01-0.03 |
| | % $Al_2O_3$ 14.8-18.2 |
| | % $SiO_2$ 62.4-73.5 |

Additionally, testing of the processed clay products from Engelhard's, Jackson, Miss. plant have confirmed low levels of TCDD in CAS (<0.33 parts per trillion, ppt). TCDD is given in Engelhard specifications as an index of the presence of dioxins in food ingredients.

Analytical Procedures and Methods for Isothermal Adsorption Analysis.

Isothermal Adsorption analysis was performed using a stock solution of aflatoxin $B_1$ ($AfB_1$) is prepared by dissolving pure $AfB_1$ crystals (Sigma Chemical Co., St. Louis, Mo.) in acetonitrile. A volume of the stock solution is then injected into purified (deionized) water, yielding an 8 μg/mL working solution of AfB1. The working solution's concentration is then verified with a UV-vis spectrophotometer ($\lambda_{max}$=362 nm; $\epsilon$=21,865). The batch isotherm procedure entails the exposure of samples containing 100 μg of sorbent to an increasing concentration of solute ($AfB_1$)(0.4, 0.8, 1.6, 2.4, 3.2, 4, 4.8, 6, 6.4, 7.2, and 8 μg/mL). This study uses three replicates at each solute concentration. The solute concentration is achieved by adding an appropriate amount of working $AfB_1$ solution to sterile 17×100 mm polypropylene centrifuge test tubes and then adding a complementary amount of purified water to bring the total volume to 5 mL/tube. Approximately 10 mg of sorbent is weighed in a 16×125 mm disposable borosilicate glass test tube, and purified water is added to the sorbent to make a 2 mg/mL suspension. This sorbent/water suspension is vortexed for 3 s before each 50 μL transfer to each replicate by an autopipetter. The mixing is repeated before each transfer. Along with the samples, there are three controls consisting of 5 mL of purified water, 5 mL of $AfB_1$ working solution without sorbent, and 5 mL of the lowest concentration of $AfB_1$ without sorbent. The samples and controls are capped and placed on an electric orbital shaker at 1,000 rpm for 24 h in an incubator at either 15, 25, or 37° C. After shaking, the samples are centrifuged at 10,000 rpm for 15 min at the same temperature that the shaking occurred. The UV-vis absorption of $AfB_1$ remaining in the supernatant from the samples and controls is measured with a spectrophotometer. At the highest $AfB_1$ concentration level, the supernatant is saved for analysis by HPLC to check for any degradation compounds since the adsorption calculations are dependent on a different calculation.

Data Calculations and Curve Fitting.

The UV-vis absorption data are used to calculate the amount of $AfB_1$ left in solution and the amount adsorbed for each data point. Using TableCurve 2D software (Systat Software Inc., Richmond, Calif.) these data are fit to the Langmuir isotherm equation:

$$q = Q_{max} \times \left( \frac{K_d \times C_w}{1 + K_d \times C_w} \right)$$

where q is the amount of $AfB_1$ adsorbed, $Q_{max}$ is the maximum amount of $AfB_1$ adsorbed, $C_w$ is the equilibrium concentration of $AfB_1$ in solution and $K_d$ is the distribution constant. The Langmuir equation is entered into the TableCurve 2D program as a user-defined function and has limits and first approximations for variable parameters. The parameter limits for $Q_{max}$ are positive numbers ranging from 0 to a maximum of 1 mol/kg. Parameter limits for $K_d$ range from 0 to $1\times10^{25}$. Starting estimates for the parameters $Q_{max}$ and $K_d$ are determined by TableCurve 2D. After these values are entered into the Langmuir user-defined function in TableCurve 2D, the data is fit, and theoretical values for $Q_{max}$ and $K_d$ are obtained. The $\Delta H_{ads}$ (enthalpy of adsorption) is calculated by comparing the individual $K_d$ values at 15, 25, and 37° C. by the equation:

$$\Delta H_{ads} = \frac{-R \ln(K_{d2}/K_{d1})}{(1/T_2) - (1/T_1)}$$

The definition of $K_d$ is derived by solving for $K_d$ from the Langmuir equation giving:

$$K_d = q/(Q_{max}-q)C_w$$

The $Q_{max}$ is taken from the fit of Langmuir equation to the adsorption data at 15, 25, and 37° C.

Methods for COLE Index.

A measure of expansive properties, the coefficient of linear extensibility (COLE) index is the ratio of the volume of a soil after wetting to the volume of soil before wetting minus one. COLE=(volume of clay after wetting/volume of clay before wetting)−1 COLE index values greater than 0.03 indicate that significant smectite (swelling clay) is present in the sample. The general procedure can be summarized as follows:

1. Add 5 mL (5 $cm^3$) of dry clay to a 25 mL graduated cylinder.
2. Add distilled water to the clay bringing the total volume to 25 mL.
3. Shake or stir suspension vigorously to ensure thorough wetting of clay.

4. Allow suspension to stand for 24 hr. at room temperature.
5. Measure the expanded volume of settled clay.

Figure 4:
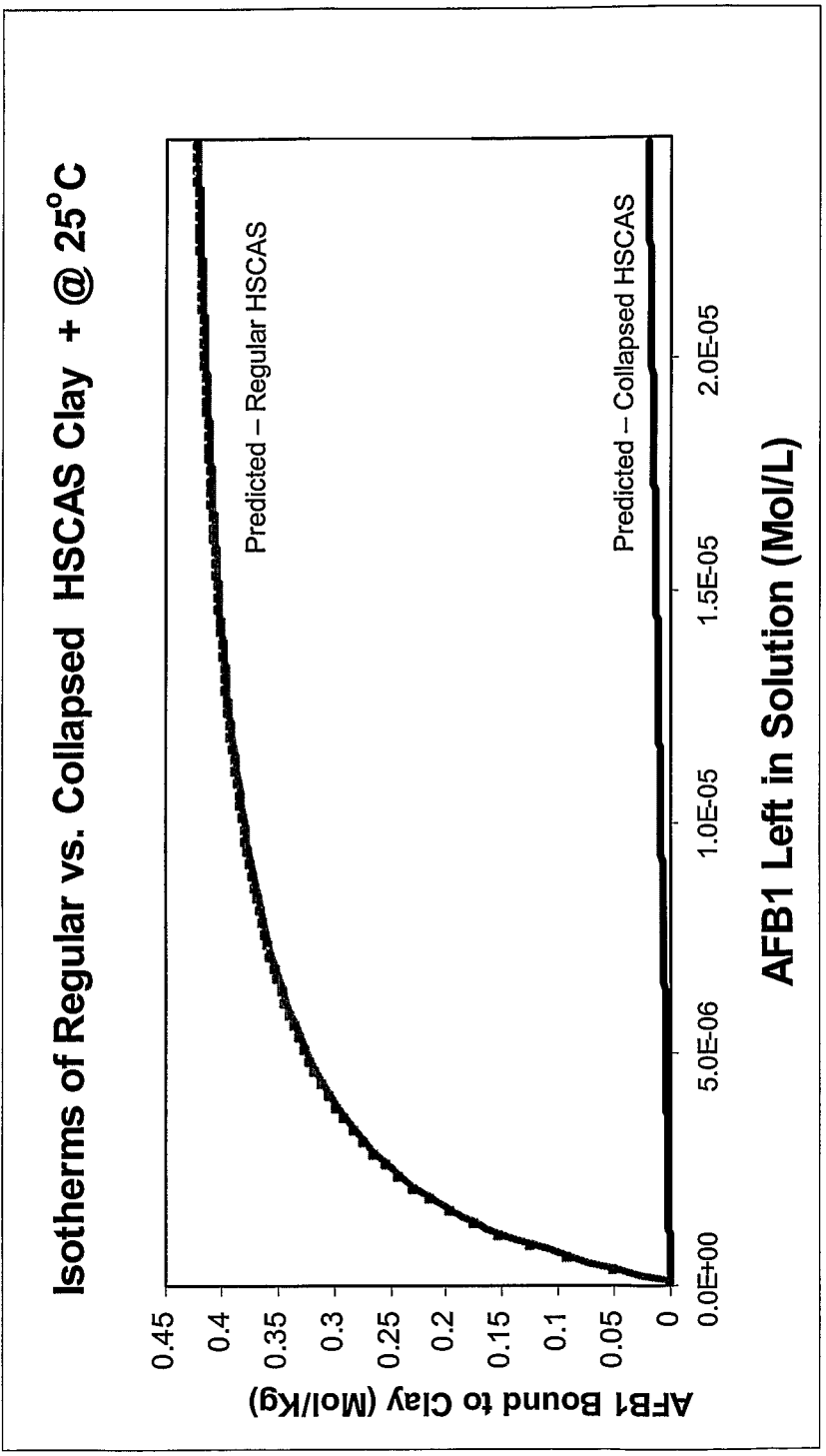
FIG. 4 shows the isotherms of regular vs. collapsed HSCAS.

Shrink-swell potential correlates closely with the kind and amount of clay. The greatest shrink-swell potential occurs in soils that have high amounts of 2:1 lattice clays, such as smectites. Illitic clays are intermediate, and kaolinitic clays are least affected by volume change as the content in moisture changes. Adsorption isotherms of regular vs. collapsed HSCAS at 25° C. are shown in FIG. 4.

Example 2

Preparation of AGIIS Having an Acid Normality of 1.2 to 1.5 Prepared by the Method of $H_2SO_4/Ca(OH)_2$ An amount of 1055 ml (19.2 moles, after purity adjustment and taking into account the amount of acid neutralized by base) of concentrated sulfuric acid (FCC Grade, 95-98% purity) was slowly added with stirring, to 16.868 L of RO/DI water in each of reaction flasks a, b, c, e, and f. The amount of water had been adjusted to allow for the volume of acid and the calcium hydroxide slurry. The mixture in each flask was mixed thoroughly. Each of the reaction flasks was chilled in an ice bath and the temperature of the mixture in the reaction flask was about 8-12° C. The mixture was continuously stirred at a rate of about 700 rpm.

Separately, a slurry was made by adding RO/DI water to 4 kg of calcium hydroxide (FCC Grace, 98% purity) making a final volume of 8 L. The mole ratio of calcium hydroxide to concentrated sulfuric acid was determined to be 0.45 to 1. The slurry was a 50% (w/v) mixture of calcium hydroxide in water. The slurry was mixed well with a high-shear-force mixer until the slurry appeared uniform. The slurry was then chilled to about 8-12° C. in an ice bath and continuous stirred at about 700 rpm.

To each of the reaction flasks was added 150 ml of the calcium hydroxide slurry every 20 minutes until 1.276 L (i.e. 638 g dry weight, 8.61 moles, of calcium hydroxide) of the slurry had been added to each reaction vessel. The addition was again accompanied by efficient mixing at about 700 rpm.

After the completion of the addition of the calcium hydroxide to the reaction mixture in each reaction vessel, the mixture was filtered through a 5-micron filter.

The filtrate was allowed to sit for 12 hours, the clear solution was decanted to discard any precipitate formed. The resulting product was AGIIS having an acid normality of 1.2-1.5.

Example 3

Preparation of AGIIS Having an Acid Normality of 2 Prepared by the Method of $H_2SO_4/Ca(OH)_2/CaSO_4$ For the preparation of 1 L of 2 N AGIIS, an amount of 79.5 ml (1.44 moles, after purity adjustment and taking into account the amount of acid to be neutralized by base) of concentrated sulfuric acid (FCC Grade, 95-98% purity) was slowly added, with stirring, to 854 ml of RO/DI water in a 2 L reaction flask. Five grams of calcium sulfate (FCC Grade, 95% purity) was then added slowly and with stirring to the reaction flask. The mixture was mixed thoroughly. At this point, analysis of the mixture would usually indicate an acid normality of 2.88. The reaction flask was chilled in an ice bath and the temperature of the mixture in the reaction flask was about 8-12° C. The mixture was continuously stirred at a rate of about 700 rpm.

Separately, a slurry was made by adding 50 ml of RO/DI water to 33.26 g (0.44 mole, after purity adjustment) of calcium hydroxide (FCC Grace, 98% purity) making a final volume of 66.53 ml. The mole ratio of calcium hydroxide to concentrated sulfuric acid was determined to be 0.44 to 1. The slurry was mixed well with a high-shear-force mixer until the slurry appeared uniform. The slurry was then chilled to about 8-12° C. in an ice bath and continuous stirred at about 700 rpm.

The slurry was then slowly added over a period of 2-3 hours to the mixture, still chilled in an ice bath and being stirred at about 700 rpm.

After the completion of the addition of slurry to the mixture, the product was filtered through a 5-micron filter. It was normal to observe a 20% loss in volume of the mixture due to the retention of the solution by the salt and removal of the salt.

The filtrate was allowed to sit for 12 hours, and the clear solution was then decanted to discard any precipitate formed. The resulting product was AGIIS having an acid normality of 2.

Example 4

Preparation of AGIIS Having an Acid Normality of 12 Prepared by the Method Of $H_2SO_4/Ca(OH)_2/CaSO_4$ For the preparation of 1 L of 12 N AGIIS, an amount of 434 ml (7.86 moles, after purity adjustment and taking into account amount of acid neutralized by base) of concentrated sulfuric acid (FCC Grade, 95-98% purity) was slowly added, with stirring, to 284.60 ml of RO/DI water in a 2 L reaction flask. Three grams of calcium sulfate (FCC Grade, 95% purity) was then added slowly and with stirring to the reaction flask. The mixture was mixed thoroughly. The reaction flask was chilled in an ice bath and the temperature of the mixture in the reaction flask was about 8-12° C. The mixture was continuously stirred at a rate of about 700 rpm.

Separately, a slurry was made by adding 211 ml of RO/DI water to 140.61 g (1.86 moles, after purity adjustment) of calcium hydroxide (FCC Grace, 98% purity) making a final volume of 281.23 ml. The mole ratio of calcium hydroxide to concentrated sulfuric acid was determined to be 0.31. The slurry was mixed well with a high-shear-force mixer until the slurry appeared uniform. The slurry was then chilled to about 8-12° C. in an ice bath and continuous stirred at about 700 rpm.

The slurry was then slowly added over a period of 2-3 hours to the acid mixture, still chilled in an ice bath and being stirred at about 700 rpm.

After the completion of the addition of slurry to the mixture, the product was filtered through a 5-micron filter. It was normal to observe a 20% loss in volume of the mixture due to the retention of the solution by the salt and removal of the salt.

The filtrate was allowed to sit for 12 hours, and the clear solution was then decanted to discard any precipitate formed. The resulting product was AGIIS having an acid normality of 12.

Example 5

General Method for the Preparation of HAMO

For a 1 L final volume of HAMO, n moles of organic acid (n is from about 0.01 to about 15) is suspended or dissolved in 2n moles of DI water. To this mixture is then added monovalent, divalent or trivalent metal base (hydroxide, oxide, carbonate or bicarbonate, or combination thereof) as the dry solid or as a slurry in DI water in the ratio of 1.0 equivalent weights of base per equivalent weight of acid. The addition is accomplished as quickly as possible. To the resultant mixture is added a quantity of regenerating acid sufficient to ensure complete regeneration of the organic acid from its metal salt, but a quantity not greater than 18 moles/L. Preferably, the addition of the regenerating acid is accomplished as quickly as possible without permitting the mixture temperature to rise above 80° C. After the mixing is complete, usually from about 0.5 hour to about 1 hour. The undissolved solids are removed by filtration through a 5-micron filter or by centrifugation.

Example 6

Formation of a HAMO from Maleic Acid, Calcium Hydroxide, and Sulfuric Acid

To a mixture of maleic acid (1 kg, 8.61 moles) and RO-DI water (1 L), solid calcium hydroxide (335 g, 4.52 moles) was added in 50-g portions with stirring. After the addition of the calcium hydroxide was complete, RO-DI water (500 ml) was added. To the resulting mixture, concentrated sulfuric acid (238 ml) was added in 25-ml aliquots at a rate that maintained the reaction temperature below 85° C. The resultant mixture was centrifuged at 15000 rpm for 25 minutes to provide the HAMO as supernatant, pH of 0.5-1.0. Analysis showed: Ca, 12,900 ppm; $SO_4$ 159,000 ppm.

Example 7

Formation of a HAMO from Gluconic Acid, Calcium Hydroxide, and Sulfuric Acid

To a stirred mixture of gluconic acid (50%, 1 kg, 2.55 moles) and water (200 ml) was added 97 g (1.3 moles) of solid calcium hydroxide. After the mixing was complete, concentrated sulfuric acid (76 ml) was added as rapidly as possible while keeping the reaction temperature below 85° C. The final mixture was centrifuged at 15,000 rpm for 25 minutes to give the HAMO as supernatant, pH of 1.0. Analysis showed: Ca, 1,210 ppm; $SO_4$, 11,600 ppm.

Example 8

Formation of a HAMO from Succinic Acid, Calcium Hydroxide, and Phosphoric Acid

Solid calcium hydroxide (320 g, 4.23 moles) was added in 50-g portions to a stirred mixture of succinic acid (1 kg, 8.47 moles) and RO-DI water (1200 ml). Concentrated phosphoric acid (529 ml, 4.75 moles) was added in 50-ml aliquots as rapidly as possible while maintaining the temperature below 85° C. The final product had a pH of 1.5. Analysis showed: Ca, 26,700 ppm; $PO_4$, 250,000 ppm.

Example 9

Formation of a HAMO from Acetic Acid, Calcium Carbonate, and Sulfuric Acid

1. Preparation of Calcium Acetate.
One liter (17.48 moles) of acetic acid was added to an eight-liter container, and one liter of water was added. Calcium carbonate powder (874 g, 8.74 mole, 99+%) was added in 100-g portions over 2.5 hours with agitation until the solution was neutral to pH paper. Water was added as needed to maintain fluidity in the mixture during the neutralization.

2. Formation of the HAMO.
Water was added to the calcium acetate formed in step 1 to bring the total volume to 3 gallons. To this solution, 17.48 moles of 95-98% sulfuric acid was added. The mixture was mixed well, and the mixing allowed to proceed without cooling. After the mixing was complete, the mixture was filtered through a 5 micron filter to give the HAMO, pH was 1.15. Analysis showed: Ca, 17,000 ppm; $PO_4$, 158,000 ppm.

In smaller scale preparations, it was more convenient to free the HAMO from undissolved solids by centrifugation.

Example 10

Formation of a HAMO from Lactic Acid, Calcium Carbonate, and Sulfuric Acid

1. Preparation of Calcium Lactate.
One liter (11.25 mole) of 85% lactic acid was added to a five-liter container, and one liter of water was added. Calcium carbonate powder (874 g, 8.74 mole, 99+%) was added in 100-g portions over 2.5 hours with agitation until the solution was neutral to pH paper. Water was added as needed to maintain fluidity in the mixture during the neutralization.

2. Formation of the HAMO.
Water was added to the calcium lactate formed in step 1 to bring the total volume to 5 gallons. To this solution, 11.25 moles of 95-98% sulfuric acid was added. The mixture was mixed well, and the mixing was allowed to proceed without cooling. After the mixing was complete, the mixture was filtered through a 5 micron filter to give the HAMO, pH of less than 1.0.

In smaller scale preparations, it was more convenient to free the HAMO from undissolved solids by centrifugation.

Example 11

Formation of a HAMO from Gluconic Acid, Ferrous Hydroxide, and Phosphoric Acid

Ferrous hydroxide was prepared by the reaction between 646 grams of ferrous sulfate and 224 grams of sodium hydroxide in RO-DI water to give a final volume of 2730 ml. The suspension of ferrous hydroxide obtained in this way was allowed to settle, the supernatant was removed by decantation, and the solid was washed three times with water by suspending in a total volume of 2730 ml allowing the solid to settle, and decanting the supernatant.

The ferrous hydroxide was suspended in RO-DI water to give a total volume of 500 ml, and this mixture was added to a mixture of gluconic acid (50%, 1 kg, 2.55 moles) and RO-DI water (100 ml). Concentrated phosphoric acid (100 ml) and sucrose (35 g) were added sequentially to this mixture. The final material did not require filtration or centrifugation, pH of 1.0. Analysis showed: Fe, 12,800 ppm; Na, 7,450 ppm; $PO_4$, 90,600 ppm; $SO_4$, 15,800 ppm.

Example 12

Formation of a HAMO from Butyric Acid, Magnesium Hydroxide, and Phosphoric Acid

To a mixture of butyric acid (500 ml, 5.4 moles) and RO-DI water (500 ml) was added solid magnesium hydroxide (163.6 g, 2.73 moles) in 25-g portions. To the resulting mixture was added concentrated phosphoric acid (180 ml) in 50-ml aliquots. The final solution had a pH of 1.0. Analysis showed: Mg, 390 ppm; $PO_4$, 1,560 ppm.

Example 13

Formation of a HAMO from Maleic Acid, Magnesium Hydroxide, and Phosphoric Acid

Solid magnesium hydroxide (300 g, 97.5%, 5.02 moles) was added in 50-g portions to stirred solution of maleic acid (1 kg, 8.53 moles) in RO-DI water (1,500 ml). At the end of the addition, the pH of the mixture was 5.0. Concentrated phosphoric acid (338 ml, 85-90%) was added in 25-ml aliquots. No precipitate was observed during the acidification step. The final pH of the HAMO solution was 1.0. Analysis showed: Mg, 19,500 ppm; $PO_4$, 287,000 ppm.

Example 14

Formation of a HAMO from Succinic Acid, Magnesium Hydroxide, and AGIIS

Solid magnesium hydroxide (101 g, 1.16 moles) was added in two equal portions to a stirred suspension of succinic acid (400 g, 3.39 moles) in RO-DI water (1 L). After the reaction was complete, AGIIS (607 ml, 5.58 N) was added in 50-ml aliquots at a rate that maintained the reaction temperature below 85° C. The solution was centrifuged at 15,000 rpm for about 25 minutes. The pH of the HAMO was 1.0-1.5. Analysis showed: Mg, 24,100 ppm; $SO_4$, 115,000 ppm.

Example 15

Formation of a HAMO from Calcium Hydroxide, a Mixture of Acetic, Lactic and Propionic Acids, and Sulfuric Acid Lactic acid (6 moles), propionic acid (6 moles), and acetic acid (6 moles) were added to a 5-gallon container and RO-DI water (1 L) was added. Solid calcium hydroxide (678 g, 9 moles) was added slowly to this mixture with stirring. To this mixture was added 9 M sulfuric acid (1 L, 9 moles $H_2SO_4$), and water (3 L) as necessary to keep the mixture mobile. The resultant mixture was filtered through a 5-micron filter. The pH of the HAMO was 0.6. Analysis showed: Ca, 205 ppm; $SO_4$, 23,900 ppm.

Example 16

Formation of a HAMO from Calcium Hydroxide, a Mixture of Formic, Lactic and Propionic Acids, and AGIIS Lactic acid (6 moles), propionic acid (6 moles), and formic acid (6 moles) were added to a 5-gallon container and a saturated solution of calcium sulfate (1 L) was added. Solid calcium hydroxide (680 g, 9 moles) was added to this mixture in 100-g portions with stirring. During the addition, the reaction temperature rose to 85° C. To this mixture was added 9 M sulfuric acid (950 ml, 8.55 moles $H_2SO_4$), AGIIS (1.2 N, 250 ml, 0.15 moles acid), and water (1 L). The resultant mixture was filtered through a 5-micron filter. The final HAMO had a pH of 1.0. Analysis showed: Ca, 215 ppm; $SO_4$, 17,000 ppm.

Example 17

Formation of a HAMO from Calcium Propionate and Sulfuric Acid

RO-DI water (2 L) was placed in an 8-L container and calcium propionate (5.36 moles) was added. The mixture was stirred, and an additional 2.5 L of RO-DI water was added to complete dissolution of the salt. Concentrated sulfuric acid (300 ml, 5.62 moles) was added, and the mixture stirred until the reaction was complete. The resultant mixture was filtered through a 5-micron filter. The pH of the HAMO was 1.5. Analysis showed Ca, 987 ppm; $SO_4$, 2,580 ppm.

Example 18

Formation of a HAMO from Calcium Lactate and AGIIS

To a mixture of 5.60 N AGIIS (1 L) and RO-DI water (1 L) was added solid calcium lactate pentahydrate (2.79 moles). The resultant mixture was allowed to stir without cooling until the mixing was complete. The final mixture was filtered through a 5-micron filter. The pH of the HAMO was 2.5-3.0. Analysis showed: Ca, 2,550 ppm; $SO_4$, 1,090 ppm.

Example 19

Formation of a Phosphoric Acid HAMMIA Using Pre-Formed AGIIS

The phosphate salt of a divalent metal chosen from List A below (1.00 mole equivalents) is suspended in sufficient deionized water to make a final volume of 625 ml per mole of phosphate ions. The mixture may be sonicated or heated as necessary to aid solubilization of the sparingly soluble phosphate salt. To this stirred suspension, a solution of AGIIS containing the desired concentration of acid (3.05 moles of hydrogen ion per mole of phosphate ion; 2.05 moles of hydrogen ion per mole of hydrogen phosphate ion; 1.05 moles of hydrogen ion per mole of dihydrogen phosphate ion) is added in 10-ml aliquots with the pH being monitored after each addition. Copious precipitates of calcium sulfate form beginning at pH 2. The addition of AGIIS solution may be discontinued as soon as the desired pH is reached. After the addition of the acid is complete, the mixture is stirred for one hour. The agitation is then stopped and the mixture is allowed to settle overnight (approximately 18 hours). The suspended solids are removed by centrifugation at 16000 rpm for 30 minutes. The supernatant solution is the HAMMIA.

| List A: Phosphate Salts |
| --- |
| $Mg_3(PO_4)_2$, $MgHPO_4$, $Mg(H_2PO_4)_2$ |
| $Ca_3(PO_4)_2$, $CaHPO_4$, $Ca(H_2PO_4)_2$ |
| $Mn_3(PO_4)_2$, $MnHPO_4$, $Mn(H_2PO_4)_2$ |
| $Fe_3(PO_4)_2$, $FeHPO_4$, $Fe(H_2PO_4)_2$ |
| $Co_3(PO_4)_2$, $CoHPO_4$, $Co(H_2PO_4)_2$ |
| $Ni_3(PO_4)_2$, $NiHPO_4$, $Ni(H_2PO_4)_2$ |
| $Cu_3(PO_4)_2$, $CuHPO_4$, $Cu(H_2PO_4)_2$ |
| $Zn_3(PO_4)_2$, $ZnHPO_4$, $Zn(H_2PO_4)_2$ |

Example 20

Formation of a Phosphoric Acid HAMMIA Using AGIIS Formed In Situ

A mixture of calcium hydroxide (1.00 mole equivalents) and the phosphate salt of a divalent metal chosen from List A below (1.00 mole equivalents) is suspended in sufficient deionized water to make a final volume of approximately 400 ml per mole of metal ions. The mixture may be sonicated or heated as necessary to aid solubilization of the sparingly soluble metal salts. To this stirred suspension, concentrated sulfuric acid (5.05 mole equivalents of hydrogen ion per mole of phosphate ion) is added in 10-ml aliquots with the pH being monitored after each addition. The addition of acid may be discontinued when the desired pH is reached. After the addition of the acid is complete, the mixture is stirred for one hour. The agitation is then stopped and the mixture is allowed to settle overnight (approximately 18 hours). The suspended solids are removed by centrifugation at 16000 rpm for 30 minutes. The supernatant solution is the HAMMIA.

| List A: Phosphate Salts |
| --- |
| $Mg_3(PO_4)_2$, $MgHPO_4$, $Mg(H_2PO_4)_2$ |
| $Ca_3(PO_4)_2$, $CaHPO_4$, $Ca(H_2PO_4)_2$ |
| $Mn_3(PO_4)_2$, $MnHPO_4$, $Mn(H_2PO_4)_2$ |
| $Fe_3(PO_4)_2$, $FeHPO_4$, $Fe(H_2PO_4)_2$ |
| $Co_3(PO_4)_2$, $CoHPO_4$, $Co(H_2PO_4)_2$ |
| $Ni_3(PO_4)_2$, $NiHPO_4$, $Ni(H_2PO_4)_2$ |
| $Cu_3(PO_4)_2$, $CuHPO_4$, $Cu(H_2PO_4)_2$ |
| $Zn_3(PO_4)_2$, $ZnHPO_4$, $Zn(H_2PO_4)_2$ |

Example 21

Formation of a Phosphoric Acid HAMMIA Containing a Monovalent Metal Using Pre-Formed AGIIS The phosphate salt of a divalent metal chosen from List A below (1.00 mole equivalents) and the phosphate salt of a monovalent metal chosen from List B below (≤1.00 mole equivalents) is suspended in sufficient deionized water to make a final volume of 625 ml per mole of phosphate ions. The mixture may be sonicated or heated as necessary to aid solubilization of the sparingly soluble divalent metal phosphate salt. To this stirred suspension, a solution of AGIIS containing the desired concentration of acid (3.05 moles of hydrogen ion per mole of phosphate ion; 2.05 moles of hydrogen ion per mole of hydrogen phosphate ion; 1.05 moles of hydrogen ion per mole of dihydrogen phosphate ion) is added in 10-ml aliquots with the pH being monitored after each addition. Copious precipitates of calcium sulfate form beginning at pH 2. The addition of AGIIS solution may be discontinued as soon as the desired pH is reached. After the addition of the acid is complete, the mixture is stirred for one hour. The agitation is then stopped and the mixture is allowed to settle overnight (approximately 18 hours). The suspended solids are removed by centrifugation at 16000 rpm for 30 minutes. The supernatant solution is the HAMMIA.

| List A:<br>Divalent Metal Phosphate Salts | List B:<br>Monovalent Metal Phosphate Salts |
| --- | --- |
| $Mg_3(PO_4)_2$, $MgHPO_4$, $Mg(H_2PO_4)_2$ | $Li_3PO_4$, $Li_2HPO_4$, $LiH_2PO_4$ |
| $Ca_3(PO_4)_2$, $CaHPO_4$, $Ca(H_2PO_4)_2$ | $Na_3PO_4$, $Na_2HPO_4$, $NaH_2PO_4$ |
| $Mn_3(PO_4)_2$, $MnHPO_4$, $Mn(H_2PO_4)_2$ | $K_3PO_4$, $K_2HPO_4$, $KH_2PO_4$ |
| $Fe_3(PO_4)_2$, $FeHPO_4$, $Fe(H_2PO_4)_2$ | |
| $Co_3(PO_4)_2$, $CoHPO_4$, $Co(H_2PO_4)_2$ | |
| $Ni_3(PO_4)_2$, $NiHPO_4$, $Ni(H_2PO_4)_2$ | |
| $Cu_3(PO_4)_2$, $CuHPO_4$, $Cu(H_2PO_4)_2$ | |
| $Zn_3(PO_4)_2$, $ZnHPO_4$, $Zn(H_2PO_4)_2$ | |

Example 22

Formation of a Phosphoric Acid HAMMIA Containing a Monovalent Metal Using AGIIS Formed In Situ A mixture of calcium hydroxide (1.00 mole equivalents) and the phosphate salt of a divalent metal chosen from List A below (1.00 mole equivalents) is suspended in sufficient deionized water to make a final volume of approximately 400 ml per mole of metal ions. The phosphate salt of a monovalent metal chosen from List B below (≤1.00 mole equivalents) is added to the mixture. The mixture may be sonicated or heated as necessary to aid solubilization of the sparingly soluble divalent metal salts. To this stirred suspension, concentrated sulfuric acid (5.05 mole equivalents of hydrogen ion per mole of phosphate ion) is added in 10-ml aliquots with the pH being monitored after each addition. The addition of acid may be discontinued when the desired pH is reached. After the addition of the acid is complete, the mixture is stirred for one hour. The agitation is then stopped and the mixture is allowed to settle overnight (approximately 18 hours). The suspended solids are removed by centrifugation at 16000 rpm for 30 minutes. The supernatant solution is the HAMMIA.

| List A:<br>Divalent Metal Phosphate Salts | List B:<br>Monovalent Metal Phosphate Salts |
| --- | --- |
| $Mg_3(PO_4)_2$, $MgHPO_4$, $Mg(H_2PO_4)_2$ | $Li_3PO_4$, $Li_2HPO_4$, $LiH_2PO_4$ |
| $Ca_3(PO_4)_2$, $CaHPO_4$, $Ca(H_2PO_4)_2$ | $Na_3PO_4$, $Na_2HPO_4$, $NaH_2PO_4$ |
| $Mn_3(PO_4)_2$, $MnHPO_4$, $Mn(H_2PO_4)_2$ | $K_3PO_4$, $K_2HPO_4$, $KH_2PO_4$ |
| $Fe_3(PO_4)_2$, $FeHPO_4$, $Fe(H_2PO_4)_2$ | |
| $Co_3(PO_4)_2$, $CoHPO_4$, $Co(H_2PO_4)_2$ | |
| $Ni_3(PO_4)_2$, $NiHPO_4$, $Ni(H_2PO_4)_2$ | |
| $Cu_3(PO_4)_2$, $CuHPO_4$, $Cu(H_2PO_4)_2$ | |
| $Zn_3(PO_4)_2$, $ZnHPO_4$, $Zn(H_2PO_4)_2$ | |

Example 23

Formation of a Phosphoric Acid HAMMIA Containing a Monovalent Metal and an Additive Acid Using Pre-Formed AGIIS One or more of the acids from List C below (up to 6 mole equivalents), the phosphate salt of a divalent metal chosen from List A below (1.00 mole equivalents) and the phosphate salt of a monovalent metal chosen from List B below (≤1.00 mole equivalents) are suspended in sufficient deionized water to make a final volume of 625 ml per mole of phosphate ions. The mixture may be sonicated or heated as necessary to aid solubilization of the sparingly soluble divalent metal phosphate salt. To this stirred suspension, a solution of AGIIS containing the desired concentration of acid (3.05 moles of hydrogen ion per mole of phosphate ion; 2.05 moles of hydrogen ion per mole of hydrogen phosphate ion; 1.05 moles of hydrogen ion per mole of dihydrogen phosphate ion) is added in 10-ml aliquots with the pH being monitored after each addition. Copious precipitates of calcium sulfate form beginning at pH 2. The addition of AGIIS solution may be discontinued as soon as the desired pH is reached. After the addition of the acid is complete, the mixture is stirred for one hour. The agitation is then stopped and the mixture is allowed to settle overnight (approximately 18 hours). The suspended solids are removed by centrifugation at 16000 rpm for 30 minutes. The supernatant solution is the HAMMIA.

List A:
Divalent Metal Phosphate Salts $Mg_3(PO_4)_2$, $MgHPO_4$, $Mg(H_2PO_4)_2$
$Ca_3(PO_4)_2$, $CaHPO_4$, $Ca(H_2PO_4)_2$
$Mn_3(PO_4)_2$, $MnHPO_4$, $Mn(H_2PO_4)_2$
$Fe_3(PO_4)_2$, $FeHPO_4$, $Fe(H_2PO_4)_2$
$Co_3(PO_4)_2$, $CoHPO_4$, $Co(H_2PO_4)_2$
$Ni_3(PO_4)_2$, $NiHPO_4$, $Ni(H_2PO_4)_2$
$Cu_3(PO_4)_2$, $CuHPO_4$, $Cu(H_2PO_4)_2$
$Zn_3(PO_4)_2$, $ZnHPO_4$, $Zn(H_2PO_4)_2$ List B:
Monovalent Metal Phosphate Salts $Li_3PO_4$, $Li_2HPO_4$, $LiH_2PO_4$
$Na_3PO_4$, $Na_2HPO_4$, $NaH_2PO_4$
$K_3PO_4$, $K_2HPO_4$, $KH_2PO_4$ List C:
Additive Acids formic acid, acetic acid, propionic
acid, butyric acid, malic acid,
glycolic acid, maleic acid, gluconic,
acid, periodic acid, peracetic acid,
monoperphthalic acid, benzoic acid,
sorbic acid, oxalic acid.

Example 24

Formation of a Phosphoric Acid HAMMIA Containing a Monovalent Metal and an Additive Acid Using AGIIS Formed In Situ A mixture of calcium hydroxide (1.00 mole equivalents) and the phosphate salt of a divalent metal chosen from List A below (1.00 mole equivalents) is suspended in sufficient deionized water to make a final volume of approximately 400 ml per mole of metal ions. One or more of the acids from List C below (up to 6 mole equivalents), and phosphate salt of a monovalent metal chosen from List B below (≤1.00 mole equivalents) is added to the mixture. The mixture may be sonicated or heated as necessary to aid solubilization of the sparingly soluble divalent metal salts. To this stirred suspension, concentrated sulfuric acid (5.05 mole equivalents of hydrogen ion per mole of phosphate ion) is added in 10-ml aliquots with the pH being monitored after each addition. The addition of acid may be discontinued when the desired pH is reached. After the addition of the acid is complete, the mixture is stirred for one hour. The agitation is then stopped and the mixture is allowed to settle overnight (approximately 18 hours). The suspended solids are removed by centrifugation at 16000 rpm for 30 minutes. The supernatant solution is the HAMMIA.

List A:
Divalent Metal Phosphate Salts $Mg_3(PO_4)_2$, $MgHPO_4$, $Mg(H_2PO_4)_2$
$Ca_3(PO_4)_2$, $CaHPO_4$, $Ca(H_2PO_4)_2$
$Mn_3(PO_4)_2$, $MnHPO_4$, $Mn(H_2PO_4)_2$
$Fe_3(PO_4)_2$, $FeHPO_4$, $Fe(H_2PO_4)_2$
$Co_3(PO_4)_2$, $CoHPO_4$, $Co(H_2PO_4)_2$
$Ni_3(PO_4)_2$, $NiHPO_4$, $Ni(H_2PO_4)_2$
$Cu_3(PO_4)_2$, $CuHPO_4$, $Cu(H_2PO_4)_2$
$Zn_3(PO_4)_2$, $ZnHPO_4$, $Zn(H_2PO_4)_2$ List B:
Monovalent Metal Phosphate Salts $Li_3PO_4$, $Li_2HPO_4$, $LiH_2PO_4$,
$Na_3PO_4$, $Na_2HPO_4$, $NaH_2PO_4$
$K_3PO_4$, $K_2HPO_4$, $KH_2PO_4$ List C:
Additive Acids formic acids, acetic acid, propionic
acid, butyric acid, malic acid,
glycolic acid, maleic acid, gluconic
acid, periodic acid, peracetic acid,
monoperphthalic acid, benzoic acid,
sorbic acid, oxalic acid.

Examples 25, 26, and 27

The samples used in the following Examples 25, 26, and 27 are abbreviated as follows:

"Acidic Adduct II" is a mixture containing lactic acid (88% W/V); propionic acid (99% W/V); 5N AGIIS; disodium phosphate; water in a % W/W ratio of 35.9:29.1:8.5:2.2:24.3. The percent composition may vary by +/−5%)

"The TESI Clay" used was pre-sieved HSCAS CLAY (or NovaSil Plus™) having a substantially uniform particle size of below about 80 microns.

"Sample 1.1" was acidified clay prepared by blending about 1:1 weight ratio of Acidic Adduct II (20 ml) (assuming 1 ml of the Acidic Adduct II is 1 g) and the TESI Clay (20 g). The resultant acidified clay is substantially free flowing.

"Sample 2.1" was acidified clay prepared by blending about 1:1.25 weight ratio of Acidic Adduct II (25 ml) (assuming 1 ml of the Acidic Adduct II is 1 g) and the TESI Clay (20 g). The resultant acidified clay is substantially free flowing.

"Sample 3.1" was acidified clay prepared by blending about 1:1 weight ratio of AGIIS (20 ml) (assuming 1 ml of AGIIS is 1 g) and the TESI Clay (20 g). Acidic Adduct II and the TESI Clay. The resultant acidified clay is lumpy and it requires grinding before use.

"Sample 4.1" was acidified clay prepared by blending about 1:1.25 weight ratio of AGIIS (25 ml) (assuming 1 ml of AGIIS is 1 g) and the TESI Clay (20 g). The resultant acidified clay is lumpy and it requires grinding before use.

"Sample 5.1" was acidified clay prepared by blending a mixture of [AGIIS (10 g) and calcium propionate (5 g)] and the TESI Clay (10 g). The resultant acidified clay looks like a piece of concrete and it requires grinding before use.

Example 25

Assessment of pH Effects of Acidified Clay in Solution

The acidified clay of the Sample 2.1 was used in this experiment.

In order to determine the fortitude of acidified clay in solution, 0.1 or 0.5 g of acidified clay was added to 10 ml of double distilled water ("ddw") (1 or 5% concentration) in a sterile, disposable plastic 15 ml culture tube. Water without added acidified clay was used as the control. Samples were vortexed for thirty seconds to mix thoroughly, then were allowed to settle for 1 hour before measuring the pH on a calibrated meter. After standing for 24 hours at room temperature, the water was decanted from the settled samples (and the control), replaced with a fresh 10 ml of ddw, and the above process repeated. This was continued until the pH of the acidified clay samples rose to near control levels. The results are summarized below:

| Day | Control | 1.0% SAMPLE 2.1 | 5.0% SAMPLE 2.1 |
|---|---|---|---|
| 0 | 5.40 | 3.05 | 2.90 |
| 1 | 5.94 | 3.67 | 3.12 |
| 2 | 5.91 | 4.40 | 4.75 |
| 3 | 5.90 | 4.75 | 3.97 |
| 4 | 5.92 | 4.71 | 4.20 |
| 8 | 5.95 | 5.17 | 4.40 |
| 10 | 5.93 | 5.42 | 4.78 |
| 17* | 6.06 | 4.35 | 3.85 |

*The samples measured at day 10 were allowed to stand for an additional week, and then remeasured without changing the solution.

Thus, the acidification is effective through at least 5 complete changes of solution, and still may retain significant efficacy when allowed to stand for longer time intervals, i.e., there may be significant addition acid remaining which simply is released more slowly.

Example 26

Antimicrobial and Anti-Fungal Properties of Different Acidified Clays

Clay pellets were prepared as follows:
1. Mixed water into powder of acidified clay. See Table A. Control was an un-acidified pre-sieved HSCAS CLAY (or NovaSil Plus™) having a substantially uniform particle size of below about 80 microns.
2. Pushed above mixture through a 1 ml syringe with tip cut off, manually cut the pellets into designed length.
3. Each pellet was weighed and recorded.
4. Set the pellets in a tray, left it in 37° C. incubator overnight to dry the pellets.
5. Different tryptic soy agar ("TSA"), growth media, plates were inoculated with: (1) *Listeria* 19111; (2) *E. coli* $O_{157}$:H7 43894; (3) *Staphylococcus* a. 6538; and (4) *Aspergillus fumigatus* ("AF") 1022. At the same time, different pellets were applied to the TSA plates at different locations. The plates were then incubated at 37° C. for 24 to 48 hours to observe if there was any zone inhibition, indicating the prevention of growth of the organisms.

TABLE A

| | Powder g | Distilled $H_2O$(ml) | % of powder |
|---|---|---|---|
| Control | 1.5 | 1 | 60% |
| Sample 1.1 | 1.5 | 0.666 | 69.25% |
| Sample 2.1 | 1 | 0.35 | 74.04% |
| Sample 4.1 | 1 | 5 | 20% |

After incubation at 37° C. for 24 to 48 hours, it was seen that in every plate, all of the Sample 1.1, Sample 2.1, and Sample 4.1 caused zone inhibition, indicating that all these samples prevent or inhibit the growth of the organisms. Sample 4.1, however, was less effective than either Sample 1.1 or Sample 2.1 in causing the zone inhibition by diffusion of the acidic "antimicrobials" from the clay. Control showed no zone inhibition, indicating that there was no prevention of growth of the organisms by the non-acidic TESI clay. Loaded clay can act as a carrier for distribution of acidic "antimicrobials."

Example 27

Isothermal Analysis of Aflatoxin Sorption to Acidified Clays

The acidified clays of the present invention also exhibited the ability to absorb aflatoxin. Acidifying a clay, such as an HSCAS clay, does not appear to alter the aflatoxin-absorption capability of the resultant acidified clay as determined by isothermal absorption analysis. The isothermal adsorption analysis was performed by the standard published method. See, Patrick G. Grant and Timothy D. Phillips, *J. Agric. Food Chem.*, 1998, 46, 599-605, the entire content of which is hereby incorporated by reference.

| LANGMUIR DERIVED PARAMETERS | | | |
|---|---|---|---|
| Clay | Qmax | Kd | $r^2$ |
| Control (HSCAS Clay) | 0.383 | 5.8E+05 | 0.974 |
| Sample 1.1 | 0.304 | 8.9E+05 | 0.956 |
| Sample 2.1 | 0.284 | 9.5E+05 | 0.940 |
| Sample 3.1 | 0.365 | 7.6E+05 | 0.946 |
| Sample 4.1 | 0.392 | 6.4E+05 | 0.959 |
| Sample 5.1 | 0.212 | 7.1E+05 | 0.946 |

Qmax is the capacity parameter, and Kd is the affinity parameter of the Langmuir equation. $r^2$ indicates "fitness."

The Table above shows that Sample 1.1, Sample 2.1, Sample 3.1, and Sample 4.1 all gave results within the acceptable limits of Qmax (aflatoxin capacity) established by the Texas Office of State Chemist for animal fees, i.e., 0.25 mol aflatoxin/Kg clay. The sorption characteristics of Sample 3.1 and Sample 4.1 are comparable to control un-acidified HSCAS clay.

Sample 5.1 has significantly less capacity than control HSCAS clay for aflatoxin sorption and the values are below the acceptable limits set for the State of Texas.

Example 28

Study to Determine if Acidified HSCAS Clay Binds to Bran

Four 100 ml cups will be filled with wheat bran. Two of the cups will have an acidified HSCAS clay added to them while

TABLE B

| | Control | | Sample 1.1 | | Sample 2.1 | | Sample 4.1 | |
|---|---|---|---|---|---|---|---|---|
| | pellets g | powder mg | pellets g | powder mg | pellets g | powder mg | pellets g | powder mg |
| AF | 0.108 | 64.8 | 0.1053 | 72.92 | 0.1031 | 76.37 | 0.105 | 70.00 |
| E. coli | 0.1113 | 66.78 | 0.1066 | 73.82 | 0.1177 | 87.18 | 0.1008 | 67.20 |
| Staph a. | 0.101 | 60.6 | 0.1005 | 69.60 | 0.1081 | 80.07 | 0.1062 | 70.80 |
| Listeria | 0.0995 | 59.7 | 0.1183 | 81.92 | 0.1199 | 88.81 | 0.0989 | 65. | the remaining cups will be filled with deionized water. The bran will be allowed to contact the acidified HSCAS clay for 1 hr and all cups will then be placed in a −84° C. freezer. Frozen cups will then be placed in a lyophilizer for 24 hr.

After lyophilization the contents of each cup will be removed and transferred to a 500 ml beaker. One hundred and fifty ml of pH 7 deionized water will then be added to each beaker and the freeze-dried bran will be allowed to rehydrate.

Bran treated with the acidified HSCAS clay will readily rehydrate and/or dissolve. However, the water treated bran will have to be physically broken up before it dissolves.

After all samples have been rehydrated, the pH of each sample will be determined. The average pH of the bran treated with water will be 5.8 whereas the pH of the bran treated with acidified HSCAS clay will be in the vicinity of 2.8. Thus, treatment with the acidified HSCAS clay will lower the pH of the treated bran and will change the rehydration characteristics of the bran.

Example 29

Using Acidified HSCAS Clay to Decontaminate Apples

Each apple in this experiment will be immersed in an *E. coli* $O_{157}$:H7 culture containing $8.8 \times 10^8$/ml for 5 minutes, and then air-dried at room temperature for about 24 hours. In one group, a volume of 300 ml of acidified HSCAS clay will be dusted onto the *E. coli* O157:H7-contaminated apples. In another group, the control group, each of the contaminated-apples will be treated with 300 ml of sterilized saline or HSCAS clay. After treatment, each apple will be homogenized. A comparison of plate-counts between treated and control groups can be made to show that apples are decontaminated by acidified HSCAS clay.

Example 30

Using Acidified HSCAS Clay to Prolong the Shelf-Life of Sausages

Half a pack of non-preserved sausages will be dusted with acidified HSCAS clay and then packed into a zip-lock bag. The bag will then be left at room temperature for 72 hours. In parallel, the other half pack of the sausage will be dipped in the same amount of autoclaved de-ionized water or HSCAS clay. After 72 hours at room temperature, the control group of sausage will be compared to the treated group to show the freshness of the treated groups.

Example 31

Mold Prevention in Cherry Tomatoes by Acidified HSCAS Clay

Acidified HSCAS clay will be dusted on moldy cherry tomatoes and non-moldy cherry tomatoes. Control samples of moldy and non-moldy cherry tomatoes will not be treated. The samples will be set on a bench at room temperature. The non-moldy cherry tomatoes that are not treated will start to mold after about 2 days incubation at room temperature.

Example 32

*Campylobacter jejuni* Recovery from Molting Hens Fed Acidified Calcium Aluminosilicate

*Campylobacter jejuni* is an recognized pathogen in poultry. This is especially true when the poultry are in a stressed condition. The effects of a 4 to 1 mixture of Calcium Aluminosilicate and Acidic Calcium Sulfate (CAPC) on the *Campylobacter jejuni* was evaluated in stressed poultry model, namely the hens were molting. Each of the hens used came from a *C. jejuni* infected flock. They were caused to molt by changing the diet to an alfalfa ration for 9 days. During this time and subsequent to the molt, the hens in treatment group 1 were fed a ration where 2% of the alfalfa ration was CAPC and hens in treatment group 2 were fed a ration consisting of 88% alfalfa, 10% grain and 2% CAPC. The control group received the alfalfa ration only with no CAPC.

Experiment 1

Cultures for *Campylobacter jejuni* were taken on day 10 after the start of CAPC. Seven of 12 control hens were positive for *C. jejuni*. The average colony recovery rate from a culture positive hens was about 3.43 logs. In contrast, Treatment Group 1 (alfalfa+CAPC) had 2 of 12 hens positive for *C. jejuni*, which indicated a recovery rate from culture positive hens of about 0.56 logs. Treatment group 2 (alfalfa+grain+CAPC) had 2 of 11 hens positive for *C. jejuni*. The recovery rate from culture positive hens was 0.78 logs.

Figure 5:
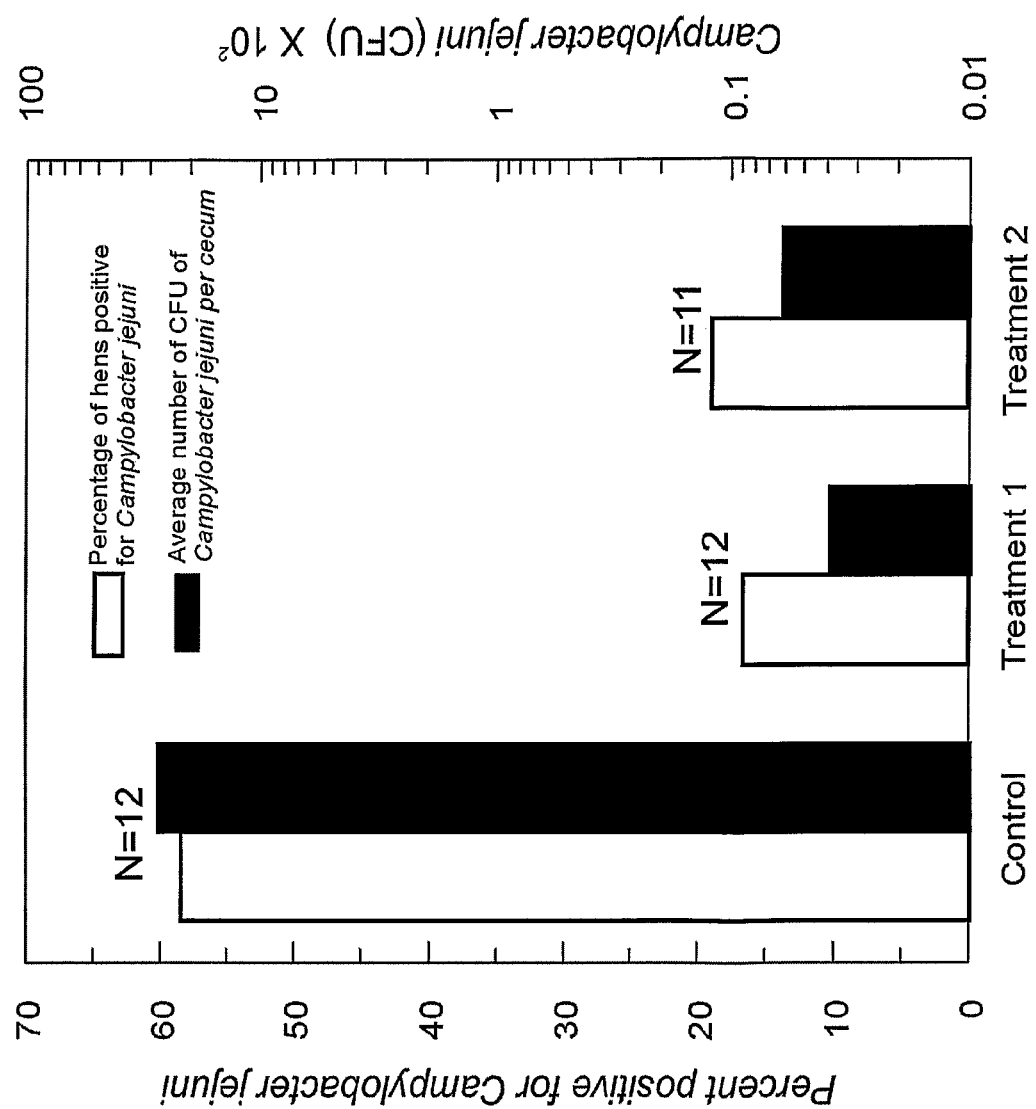
FIG. 5 shows cultures for *Campylobacter jejuni* were taken on day 10 after the start of CAPC.

The results of this experiment are illustrated in FIG. 5. One can conclude that the inclusion of 2% CAPC in the diet of stressed hens can have a significant effect on the number of *C. jejuni* infected hens and the severity of their infection. For example, an animal model containing molting laying hens were observed during a 9 day molt. The hens were naturally infected with *Campylobacter*.

Experiment 2

About 8 logs *Campylobacter* were inoculated on Butterfield media containing various amounts of 1:4 CAPC (RTE 03) as follows:
(a) 5 grams 1:4 CAPC (RTE 03)—no growth;
(b) 1 gram 1:4 CAPC (RTE 03)—no growth;
(c) 0.5 gram 1:4 CAPC (RTE 03)—27 organisms/mL or 2.43 logs;
(d) 0.1 gram 1:4 CAPC (RTE 03)—562 organisms/mL or 3.74 logs.

As indicated, amounts of 1:4 CAPC (RTE 03) that were above about 1 gram inhibited growth in the media.

Example 33

The Effect of Body Weight Gain in Chickens Fed Acid-Clay

The effect of body weight gain in chickens fed acid-clay was determined by feeding chickens a diet containing 1% acid clay for 8 days. The results indicated that chickens fed a control diet weighed about 0.520 Kg after consuming about 1.519 kg of feed. In contrast, the results indicated that chickens fed diet having 1% acidic clay weighed about 0.585 Kg after consuming about 1.528 kg of feed. The results indicate that chickens will eat feed containing acidified clay and that there is a benefit to growth and feed efficiency.

Example 34

The Effect of Combinations of Chill Water and Packaging Treatments on the Microbial Shelf Life of Fresh Chicken during Refrigerated Storage The effect of and acidic mixture is a sparingly-soluble Group IIA complex ("AGIIS") chill water treatment combined with a AGIIS-clay soaker pad treatment on the microbial shelf life of fresh chicken pieces (hindquarters) during storage at −2° C. for 7 days followed by storage at 3° C. for an additional 11 days was determined. Generally, about 120 fresh cut, chilled chicken hindquarters were obtained from a commercial poultry slaughter facility. This product was derived/fabricated from chicken carcasses that had been processed per the plant's standard operating procedures. This plant did not use any chemical interventions other than a chlorinated wash of the birds prior to de-feathering and chlorinated chill water. The samples were collected from the poultry facility and transported in insulated containers with ice to the laboratory and were held overnight at 34° F. until initiating the study.

The samples were processed using tap water for all treatment solutions. All solutions were pre-cooled to 4° C. for about 24 hours prior to use. The chilled, treatment solutions were prepared as generally described in above examples of AGIIS to a pH of about 6.0 and an ORP reading of 750-800 mV using sodium hypochlorite (i.e., bleach) using a municipal tap water source ("the ACS-50 solution"). The respective solutions were prepared just prior to immersion of the chicken pieces. At least 36 chicken pieces (i.e., chicken hindquarter) were subjected to each treatment variable, as described below (i.e., chill and soaker pad combination) to provide one extra sample set. Following the designated chill treatments, samples pieces were each allowed to drip for ca. 15 sec. before packaging (one per package) in conventional styrofoam trays with designated absorbent pads (i.e., treated or control) and over-wrapped with saran film for storage.

Each of the packaged chicken pieces were subjected to the following treatment variables:

(1) Simulated immersion chill with tap water for 60 min @ 4° C. followed by packaging with standard (untreated) soaker pads. Chill water will be continuously stirred/agitated (e.g. with magnetic stir bars) during the immersion treatment. The ORP and pH of the solution will be measured at the beginning (pre-immersion) and at the end of the treatment.

(2) Simulated immersion chill with ACS-50 treated water (i.e., pH of 6.0 with ORP of 750-800) for 60 min @ 4° C. followed by packaging with standard (untreated) soaker pads. Chill water will be stirred/agitated (e.g., with magnetic stir bars) throughout the immersion period. The ORP and pH of the solution will be measured at the beginning (pre-immersion) and at the end of the treatment. Additionally, the pH and ORP of the solution will be monitored and adjusted as required (using Mionix chemistry and sodium hypochlorite solution) during the immersion treatment (e.g., after 5, 10, 15, 20, 30, 40, and 50 min.).

(3) Simulated immersion chill with ACS-50 treated water (i.e., pH of 6.0 with ORP of 750-800) for 60 min @ 4° C. followed by packaging with treated soaker pads. Chill water will be stirred/agitated (e.g., with magnetic stir bars) throughout the immersion period. The ORP and pH of the solution will be measured at the beginning (pre-immersion) and at the end of the treatment. Additionally, the pH and ORP of the solution will be monitored and adjusted as required (using Mionix chemistry and sodium hypochlorite solution) during the immersion treatment (e.g., after 5, 10, 15, 20, 30, 40, and 50 min.). Four sample/packages for each treatment variable will be collected for analysis at time-0 (immediately after treatment and packaging). The remaining packages will subsequently be stored at −2° C. for 7 days after which time another set of 4 sample/packages samples from each treatment variable will be collected for analysis. The remaining packages will subsequently be transferred to storage at 3° C. with a set of samples from each treatment being collected for analysis after 13, 14, 15, 16, 17, and 18 total days of storage (i.e., 7 days @ −2° C. plus 6, 7, 8, 9, 10 or 11 days @ 3° C.).

For each treatment variable, four designated sample packages (i.e., chicken piece and corresponding soaker pad) were microbiologically analyzed for spoilage organisms initially (time-0) and after storage as summarized in the table below.

| | | Total Storage Time (days) and Reps (per day) | | | | | | | | |
|---|---|---|---|---|---|---|---|---|---|---|
| Treatment Number | Sample Subunit | 0 | 7 @ −2° C. | 13 +6, | 14 7, 8, | 15 9, 10, | 16 11 days | 17 @ −3° C. | 18 | Totals |
| 1 | Chicken | 4 | 4 | 4 | 4 | 4 | 4 | 4 | 4 | 32 |
|   | Pad | 4 | 4 | 4 | 4 | 4 | 4 | 4 | 4 | 32 |
| 2 | Chicken | 4 | 4 | 4 | 4 | 4 | 4 | 4 | 4 | 32 |
|   | Pad | 4 | 4 | 4 | 4 | 4 | 4 | 4 | 4 | 32 |
| 3 | Chicken | 4 | 4 | 4 | 4 | 4 | 4 | 4 | 4 | 32 |
|   | Pad | 4 | 4 | 4 | 4 | 4 | 4 | 4 | 4 | 32 |

Chicken Pieces.

For chicken pieces, a modified rinse technique (based upon USDA methods for whole carcasses) was used for microbial analyses. The product piece in each package was aseptically placed in a sterile stomacher bag with 100 ml of sterile DE Neutralizing Broth. Sample weights were recorded. Samples were thoroughly shaken and massaged by hand for 1 min. and then rinsated serially diluted in Butterfield's phosphate buffer (BPB) as required.

Soaker Pads.

The pad in each package was also be sampled by aseptically placing it in a tared stomacher bag and the pad weight recorded. The pad along with 10 ml of sterile DE Neutralizing Broth was stomached for one min. and the rinsate serially diluted in BPB as required.

Analyses.

Sample rinsates/dilutions was assayed for Aerobic Plate Counts ("APC") using standard methods agar and for Gram-negative counts using Crystal Violet Tetrazolium Agar ("CVTA") and standard pour plating procedures (Compendium of Methods for the Microbiological Examination of Foods, 4th edition, 2001, APHA). All plates will be incubated at 22-25° C. for 5 days to include mesophilic and psychrotrophic spoilage bacteria.

Aroma Observations.

Immediately upon opening each sample package, the odor of the sample will be rated as 1) acceptable, 2) slight off-odor, or 3) unacceptable off-odor. These observations will be recorded and tabulated. Any other distinctive sensory changes will also be noted as indicated.

The results are indicated in Tables 1-5, shown below.

TABLE 1

Effect of Chill Water and Soaker Pad Treatments on The Aerobic Plate Counts of Fresh Chicken Hindquarters During Refrigerated Storage.

| Storage Time (days) | | Control (Tap Water) Standard Soaker Pad | | ACS-50 Standard Soaker Pad | | ACS-50 Treated Soaker Pad | |
|---|---|---|---|---|---|---|---|
| | | CFU/mL | $\log_{10}$ CFU/mL | CFU/mL | $\log_{10}$ CFU/mL | CFU/mL | $\log_{10}$ CFU/mL |
| 0 | rep. 1 | 11,000 | 4.04 | 970 | 2.99 | 1,800 | 3.26 |
| | rep. 2 | 1,100 | 3.04 | 850 | 2.93 | 670 | 2.83 |
| | rep. 3 | 2,600 | 3.41 | 1,600 | 3.20 | 12,000 | 4.08 |
| | rep. 4 | 2,100 | 3.32 | 740 | 2.87 | 690 | 2.84 |
| | Mean | | 3.45 | | 3.00 | | 3.25 |
| | Std. Dev. | | 0.42 | | 0.15 | | 0.59 |
| 7 (−2° C.) | rep. 1 | 10,000 | 4.00 | 15,000 | 4.18 | 38,000 | 4.58 |
| | rep. 2 | 6,200 | 3.79 | 6,400 | 3.81 | 15,000 | 4.18 |
| | rep. 3 | 3,900 | 3.59 | 13,000 | 4.11 | 38,000 | 4.58 |
| | rep. 4 | 4,900 | 3.69 | 20,000 | 4.30 | 2,300 | 3.36 |
| | Mean | | 3.77 | | 4.10 | | 4.17 |
| | Std. Dev. | | 0.17 | | 0.21 | | 0.57 |
| 13 (3° C.) | rep. 1 | 180,000,000 | 8.26 | 380,000,000 | 8.58 | 290,000,000 | 8.46 |
| | rep. 2 | 71,000,000 | 7.85 | 58,000,000 | 7.76 | 500,000,000 | 8.70 |
| | rep. 3 | 3,800,000,000 | 9.58 | 460,000,000 | 8.66 | 440,000,000 | 8.64 |
| | rep. 4 | 35,000,000 | 7.54 | 1,400,000,000 | 9.15 | 1,100,000,000 | 9.04 |
| | Mean | | 8.31 | | 8.54 | | 8.71 |
| | Std. Dev. | | 0.90 | | 0.57 | | 0.24 |
| 14 (3° C.) | rep. 1 | 15,000,000,000 | 10.18 | 10,000,000,000 | 10.00 | 5,400,000,000 | 9.73 |
| | rep. 2 | 18,000,000,000 | 10.26 | 14,000,000,000 | 10.15 | 15,000,000,000 | 10.18 |
| | rep. 3 | 3,300,000,000 | 9.52 | 52,000,000,000 | 10.72 | 19,000,000,000 | 10.28 |
| | rep. 4 | 10,000,000,000 | 10.00 | 16,000,000,000 | 10.20 | 6,000,000,000 | 9.78 |
| | Mean | | 9.99 | | 10.27 | | 9.99 |
| | Std. Dev. | | 0.33 | | 0.31 | | 0.28 |
| 15 (3° C.) | rep. 1 | 32,000,000,000 | 10.51 | 13,000,000,000 | 10.11 | 17,000,000,000 | 10.23 |
| | rep. 2 | 14,000,000,000 | 10.15 | 32,000,000,000 | 10.51 | 28,000,000,000 | 10.45 |
| | rep. 3 | 24,000,000,000 | 10.38 | 17,000,000,000 | 10.23 | 9,900,000,000 | 10.00 |
| | rep. 4 | 23,000,000,000 | 10.36 | 26,000,000,000 | 10.41 | 21,000,000,000 | 10.32 |
| | Mean | | 10.35 | | 10.32 | | 10.25 |
| | Std. Dev. | | 0.15 | | 0.18 | | 0.19 |
| 16 (3° C.) | rep. 1 | 20,000,000,000 | 10.30 | 12,000,000,000 | 10.08 | 11,000,000,000 | 10.04 |
| | rep. 2 | 12,000,000,000 | 10.08 | 39,000,000,000 | 10.59 | 24,000,000,000 | 10.38 |
| | rep. 3 | 15,000,000,000 | 10.18 | 13,000,000,000 | 10.11 | 23,000,000,000 | 10.36 |
| | rep. 4 | 39,000,000,000 | 10.59 | 10,000,000,000 | 10.00 | 13,000,000,000 | 10.11 |
| | Mean | | 10.29 | | 10.20 | | 10.22 |
| | Std. Dev. | | 0.22 | | 0.27 | | 0.17 |
| 17 (3° C.) | | | | sampling discontinued | | | |
| 18 (3° C.) | | | | sampling discontinued | | | |

Notes:
1) Counts expressed as CFU per mL of sample rinse (100 mL rinse).

TABLE 2

Effect of Chill Water and Soaker Pad Treatments on the Gram Negative Plate Counts of Fresh Chicken Hindquarters During Refrigerated Storage.

| Storage Time (days) | | Control (Tap Water) Standard Soaker Pad | | ACS-50 Standard Soaker Pad | | ACS-50 Treated Soaker Pad | |
|---|---|---|---|---|---|---|---|
| | | CFU/mL | $\log_{10}$ CFU/mL | CFU/mL | $\log_{10}$ CFU/mL | CFU/mL | $\log_{10}$ CFU/mL |
| 0 | rep. 1 | 1,600 | 3.20 | 310 | 2.49 | 250 | 2.40 |
| | rep. 2 | 640 | 2.81 | 280 | 2.45 | 410 | 2.61 |
| | rep. 3 | 1,100 | 3.04 | 590 | 2.77 | 2,400 | 3.38 |
| | rep. 4 | 1,600 | 3.20 | 230 | 2.36 | 470 | 2.67 |
| | Mean | | 3.06 | | 2.52 | | 2.77 |
| | Std. Dev. | | 0.19 | | 0.18 | | 0.43 |
| 7 (−2° C.) | rep. 1 | 46,000 | 4.66 | 5,000 | 3.70 | 29,000 | 4.46 |
| | rep. 2 | 5,100 | 3.71 | 6,300 | 3.80 | 20,000 | 4.30 |
| | rep. 3 | 4,900 | 3.69 | 17,000 | 4.23 | 36,000 | 4.56 |
| | rep. 4 | 5,500 | 3.74 | 26,000 | 4.41 | 2,500 | 3.40 |
| | Mean | | 3.95 | | 4.04 | | 4.18 |
| | Std. Dev. | | 0.48 | | 0.34 | | 0.53 |

TABLE 2-continued

Effect of Chill Water and Soaker Pad Treatments on the Gram Negative Plate Counts of Fresh Chicken Hindquarters During Refrigerated Storage.

| Storage Time (days) | | Control (Tap Water) Standard Soaker Pad | | ACS-50 Standard Soaker Pad | | ACS-50 Treated Soaker Pad | |
|---|---|---|---|---|---|---|---|
| | | CFU/mL | Log$_{10}$ CFU/mL | CFU/mL | Log$_{10}$ CFU/mL | CFU/mL | Log$_{10}$ CFU/mL |
| 13 | rep. 1 | 420,000,000 | 8.62 | 530,000,000 | 8.72 | 400,000,000 | 8.60 |
| (3° C.) | rep. 2 | 48,000,000 | 7.68 | 120,000,000 | 8.08 | 490,000,000 | 8.69 |
| | rep. 3 | 2,600,000,000 | 9.41 | 560,000,000 | 8.75 | 580,000,000 | 8.76 |
| | rep. 4 | 25,000,000 | 7.40 | 1,700,000,000 | 9.23 | 1,400,000,000 | 9.15 |
| | Mean | | 8.28 | | 8.70 | | 8.80 |
| | Std. Dev. | | 0.92 | | 0.47 | | 0.24 |
| 14 | rep. 1 | 31,000,000,000 | 10.49 | 20,000,000,000 | 10.30 | 22,000,000,000 | 10.34 |
| (3° C.) | rep. 2 | 23,000,000,000 | 10.36 | 12,000,000,000 | 10.08 | 16,000,000,000 | 10.20 |
| | rep. 3 | 3,400,000,000 | 9.53 | 31,000,000,000 | 10.49 | 42,000,000,000 | 10.62 |
| | rep. 4 | 12,000,000,000 | 10.08 | 8,400,000,000 | 9.92 | 4,200,000,000 | 9.62 |
| | Mean | | 10.12 | | 10.20 | | 10.20 |
| | Std. Dev. | | 0.43 | | 0.25 | | 0.42 |
| 15 | rep. 1 | 27,000,000,000 | 10.43 | 15,000,000,000 | 10.18 | 14,000,000,000 | 10.15 |
| (3° C.) | rep. 2 | 18,000,000,000 | 10.26 | 40,000,000,000 | 10.60 | 25,000,000,000 | 10.40 |
| | rep. 3 | 24,000,000,000 | 10.38 | 23,000,000,000 | 10.36 | 12,000,000,000 | 10.08 |
| | rep. 4 | 17,000,000,000 | 10.23 | 25,000,000,000 | 10.40 | 22,000,000,000 | 10.34 |
| | Mean | | 10.32 | | 10.38 | | 10.24 |
| | Std. Dev. | | 0.10 | | 0.17 | | 0.15 |
| 16 | rep. 1 | 17,000,000,000 | 10.23 | 10,000,000,000 | 10.00 | 15,000,000,000 | 10.18 |
| (3° C.) | rep. 2 | 12,000,000,000 | 10.08 | 34,000,000,000 | 10.53 | 28,000,000,000 | 10.45 |
| | rep. 3 | 16,000,000,000 | 10.20 | 24,000,000,000 | 10.38 | 37,000,000,000 | 10.57 |
| | rep. 4 | 59,000,000,000 | 10.77 | 11,000,000,000 | 10.04 | 75,000,000,000 | 10.88 |
| | Mean | | 10.32 | | 10.24 | | 10.52 |
| | Std. Dev. | | 0.31 | | 0.26 | | 0.29 |
| 17 (3° C.) | | | | sampling discontinued | | | |
| 18 (3° C.) | | | | sampling discontinued | | | |

Notes:
1) Counts expressed as CFU per mL of sample rinse (100 mL rinse).

TABLE 3

Effect of Chill Water and Soaker Pad Treatments on The Aerobic Plate Counts of Soaker Pads from Fresh Chicken Hindquarters During Refrigerated Storage.

| Storage Time (days) | | Control (Tap Water) Standard Soaker Pad | | ACS-50 Standard Soaker Pad | | ACS-50 Treated Soaker Pad | |
|---|---|---|---|---|---|---|---|
| | | CFU/pad | Log$_{10}$ CFU/pad | CFU/pad | Log$_{10}$ CFU/pad | CFU/pad | Log$_{10}$ CFU/pad |
| 0 | rep. 1 | 2,200 | 3.34 | 1,600 | 3.20 | <10 | <1.00 |
| | rep. 2 | 1,100 | 3.04 | 420 | 2.62 | 1,300 | 3.11 |
| | rep. 3 | 870 | 2.94 | 1,100 | 3.04 | 56,000 | 4.75 |
| | rep. 4 | 4,700 | 3.67 | 600 | 2.78 | 150 | 2.18 |
| | Mean | | 3.25 | | 2.91 | | 2.76 |
| | Std. Dev. | | 0.33 | | 0.26 | | 1.58 |
| 7 | rep. 1 | 8,500 | 3.93 | 3,100 | 3.49 | <10 | <1.00 |
| (−2° C.) | rep. 2 | 3,400 | 3.53 | 2,900 | 3.46 | <10 | <1.00 |
| | rep. 3 | 11,000 | 4.04 | 12,000 | 4.08 | <10 | <1.00 |
| | rep. 4 | 16,000 | 4.20 | 14,000 | 4.15 | <10 | <1.00 |
| | Mean | | 3.93 | | 3.79 | | <1.00 |
| | Std. Dev. | | 0.29 | | 0.37 | | 0.00 |
| 13 | rep. 1 | 8,300,000,000 | 9.92 | 3,600,000,000 | 9.56 | 3,900,000,000 | 9.59 |
| (3° C.) | rep. 2 | 1,100,000,000 | 9.04 | 720,000,000 | 8.86 | 1,300,000 | 6.11 |
| | rep. 3 | 1,500,000,000 | 9.18 | 12,000,000,000 | 10.08 | 11,000,000 | 7.04 |
| | rep. 4 | 150,000,000 | 8.18 | 29,000,000,000 | 10.46 | 1,800,000 | 6.26 |
| | Mean | | 9.08 | | 9.74 | | 7.25 |
| | Std. Dev. | | 0.71 | | 0.70 | | 1.61 |
| 14 | rep. 1 | 150,000,000,000 | 11.18 | 150,000,000,000 | 11.18 | 12,000,000,000 | 10.08 |
| (3° C.) | rep. 2 | 330,000,000,000 | 11.52 | 170,000,000,000 | 11.23 | nd | nd |
| | rep. 3 | 24,000,000,000 | 10.38 | 410,000,000,000 | 11.61 | 46,000,000 | 7.66 |
| | rep. 4 | 47,000,000,000 | 10.67 | 190,000,000,000 | 11.28 | 400,000 | 5.60 |
| | Mean | | 10.94 | | 11.32 | | 7.78 |
| | Std. Dev. | | 0.51 | | 0.20 | | 2.24 |

TABLE 3-continued

Effect of Chill Water and Soaker Pad Treatments on The Aerobic Plate Counts of Soaker Pads from Fresh Chicken Hindquarters During Refrigerated Storage.

| Storage Time (days) | | Treatment Variable | | | | | |
|---|---|---|---|---|---|---|---|
| | | Control (Tap Water) Standard Soaker Pad | | ACS-50 Standard Soaker Pad | | ACS-50 Treated Soaker Pad | |
| | | CFU/pad | $Log_{10}$ CFU/pad | CFU/pad | $Log_{10}$ CFU/pad | CFU/pad | $Log_{10}$ CFU/pad |
| 15 (3° C.) | rep. 1 | 460,000,000,000 | 11.66 | 110,000,000,000 | 11.04 | 38,000,000,000 | 10.58 |
| | rep. 2 | 330,000,000,000 | 11.52 | 330,000,000,000 | 11.52 | 190,000,000,000 | 11.28 |
| | rep. 3 | 130,000,000,000 | 11.11 | 480,000,000,000 | 11.68 | 5,100,000 | 6.71 |
| | rep. 4 | 490,000,000,000 | 11.69 | 300,000,000,000 | 11.48 | 82,000,000,000 | 10.91 |
| | Mean | | 11.50 | | 11.43 | | 9.87 |
| | Std. Dev. | | 0.27 | | 0.27 | | 2.13 |
| 16 (3° C.) | rep. 1 | 120,000,000,000 | 11.08 | 3,700,000,000 | 9.57 | 95,000,000,000 | 10.98 |
| | rep. 2 | 93,000,000,000 | 10.97 | 200,000,000,000 | 11.30 | 340,000,000,000 | 11.53 |
| | rep. 3 | 170,000,000,000 | 11.23 | 370,000,000,000 | 11.57 | 280,000,000,000 | 11.45 |
| | rep. 4 | 370,000,000,000 | 11.57 | 22,000,000,000 | 10.34 | 190,000,000,000 | 11.,28 |
| | Mean | | 11.21 | | 10.69 | | 11.31 |
| | Std. Dev. | | 0.26 | | 0.92 | | 0.24 |
| 17 (3° C.) | | | | sampling discontinued | | | |
| 18 (3° C.) | | | | sampling discontinued | | | |

Notes:
1) Counts expressed as CFU per soaker pad.
2) nd = no data due to lab error.

TABLE 4

Effect of Chill Water and Soaker Pad Treatments on the Gram Negative Plate Counts of Soaker Pads from Fresh Chicken Hindquarters During Refrigerated Storage.

| Storage Time (days) | | Treatment Variable | | | | | |
|---|---|---|---|---|---|---|---|
| | | Control (Tap Water) Standard Soaker Pad | | ACS-50 Standard Soaker Pad | | ACS-50 Treated Soaker Pad | |
| | | CFU/pad | $Log_{10}$ CFU/pad | CFU/pad | $Log_{10}$ CFU/pad | CFU/pad | $Log_{10}$ CFU/pad |
| 0 | rep. 1 | 940 | 2.97 | 910 | 2.96 | <10 | <1.00 |
| | rep. 2 | 930 | 2.97 | 230 | 2.36 | 900 | 2.95 |
| | rep. 3 | 620 | 2.79 | 750 | 2.88 | 30 | 1.48 |
| | rep. 4 | 4,800 | 3.68 | 310 | 2.49 | 30 | 1.48 |
| | Mean | | 3.10 | | 2.67 | | 1.73 |
| | Std. Dev. | | 0.39 | | 0.29 | | 0.85 |
| 7 (−2° C.) | rep. 1 | 14,000 | 4.15 | 1,100 | 3.04 | <10 | <1.00 |
| | rep. 2 | 4,700 | 3.67 | 4,700 | 3.67 | <10 | <1.00 |
| | rep. 3 | 10,000 | 4.00 | 6,600 | 3.82 | <10 | <1.00 |
| | rep. 4 | 11,000 | 4.04 | 15,000 | 4.18 | <10 | <1.00 |
| | Mean | | 3.96 | | 3.68 | | <1.00 |
| | Std. Dev. | | 0.20 | | 0.47 | | 0.00 |
| 13 (3° C.) | rep. 1 | 9,100,000,000 | 9.96 | 3,800,000,000 | 9.58 | 3,900,000,000 | 9.59 |
| | rep. 2 | 700,000,000 | 8.85 | 630,000,000 | 8.80 | 670,000 | 5.83 |
| | rep. 3 | 1,100,000,000 | 9.04 | 8,800,000,000 | 9.94 | 29,000,000 | 7.46 |
| | rep. 4 | 160,000,000 | 8.20 | 44,000,000,000 | 10.64 | nd | nd |
| | Mean | | 9.01 | | 9.74 | | 7.63 |
| | Std. Dev. | | 0.73 | | 0.77 | | 1.89 |
| 14 (3° C.) | rep. 1 | 260,000,000,000 | 11.41 | 150,000,000,000 | 11.18 | 12,000,000,000 | 10.08 |
| | rep. 2 | 200,000,000,000 | 11.30 | 23,000,000,000 | 10.36 | 120,000,000,000 | 11.08 |
| | rep. 3 | 27,000,000,000 | 10.43 | 580,000,000,000 | 11.76 | 63,000,000 | 7.80 |
| | rep. 4 | 70,000,000,000 | 10.85 | 340,000,000,000 | 11.53 | 2,300,000 | 6.36 |
| | Mean | | 11.00 | | 11.21 | | 8.83 |
| | Std. Dev. | | 0.45 | | 0.61 | | 2.14 |
| 15 (3° C.) | rep. 1 | 420,000,000,000 | 11.62 | 130,000,000,000 | 11.11 | 51,000,000,000 | 10.71 |
| | rep. 2 | 290,000,000,000 | 11.46 | 330,000,000,000 | 11.52 | 140,000,000,000 | 11.15 |
| | rep. 3 | 120,000,000,000 | 11.08 | 600,000,000,000 | 11.78 | 2,500,000 | 6.40 |
| | rep. 4 | 290,000,000,000 | 11.46 | 270,000,000,000 | 11.43 | 30,000,000,000 | 10.48 |
| | Mean | | 11.41 | | 11.46 | | 9.68 |
| | Std. Dev. | | 0.23 | | 0.27 | | 2.21 |

TABLE 4-continued

Effect of Chill Water and Soaker Pad Treatments on the Gram Negative Plate Counts of Soaker Pads from Fresh Chicken Hindquarters During Refrigerated Storage.

| Storage Time (days) | | Control (Tap Water) Standard Soaker Pad | | ACS-50 Standard Soaker Pad | | ACS-50 Treated Soaker Pad | |
|---|---|---|---|---|---|---|---|
| | | CFU/pad | $Log_{10}$ CFU/pad | CFU/pad | $Log_{10}$ CFU/pad | CFU/pad | $Log_{10}$ CFU/pad |
| 16 (3° C.) | rep. 1 | 150,000,000,000 | 11.18 | 7,800,000,000 | 9.89 | 140,000,000,000 | 11.15 |
| | rep. 2 | 92,000,000,000 | 10.96 | 260,000,000,000 | 11.41 | 250,000,000,000 | 11.40 |
| | rep. 3 | 170,000,000,000 | 11.23 | 400,000,000,000 | 11.60 | 320,000,000,000 | 11.51 |
| | rep. 4 | 370,000,000,000 | 11.57 | 24,000,000,000 | 10.38 | 250,000,000,000 | 11.40 |
| | Mean | | 11.23 | | 10.82 | | 11.36 |
| | Std. Dev. | | 0.25 | | 0.82 | | 0.15 |
| 17 (3° C.) | | | | sampling discontinued | | | |
| 18 (3° C.) | | | | sampling discontinued | | | |

Notes:
1) Counts expressed as CFU per soaker pad.
2) nd = no data due to lab error.

TABLE 5

Effect of Chill Water and Soaker Pad Treatments on the Aroma of Fresh Chicken Hindquarters During Refrigerated Storage.

| Storage Time (days) | | Control (Tap Water) Standard Soaker Pad | ACS-50 Standard Soaker Pad | ACS-50 Treated Soaker Pad |
|---|---|---|---|---|
| 0 | rep. 1 | 1 | 1 | 1 |
| | rep. 2 | 1 | 1 | 1 |
| | rep. 3 | 1 | 1 | 1 |
| | rep. 4 | 1 | 1 | 1 |
| | Mean | 1.00 | 1.00 | 1.00 |
| 7 (−2° C.) | rep. 1 | 1 | 1 | 1 |
| | rep. 2 | 1 | 1 | 1 |
| | rep. 3 | 1 | 1 | 1 |
| | rep. 4 | 1 | 1 | 1 |
| | Mean | 1.00 | 1.00 | 1.00 |
| 13 (3° C.) | rep. 1 | 1 | 1 | 1 |
| | rep. 2 | 1 | 1 | 1 |
| | rep. 3 | 1 | 2 | 2 |
| | rep. 4 | 1 | 2 | 1 |
| | Mean | 1.00 | 1.67 | 1.33 |
| 14 (3° C.) | rep. 1 | 2 | 1 | 1 |
| | rep. 2 | 1 | 1 | 2 |
| | rep. 3 | 1 | 2 | 1 |
| | rep. 4 | 1 | 2 | 1 |
| | Mean | 1.00 | 1.67 | 1.33 |
| 15 (3° C.) | rep. 1 | 3 | 3 | 2 |
| | rep. 2 | 3 | 3 | 3 |
| | rep. 3 | 3 | 3 | 3 |
| | rep. 4 | 3 | 3 | 3 |
| | Mean | 3.00 | 3.00 | 3.00 |
| 16 (3° C.) | rep. 1 | 2 | 2 | 2 |
| | rep. 2 | 1 | 2 | 3 |
| | rep. 3 | 2 | 2 | 3 |
| | rep. 4 | 3 | 1 | 2 |
| | Mean | 2.00 | 1.67 | 2.67 |
| 17 (3° C.) | | | sampling discontinued | |
| 18 (3° C.) | | | sampling discontinued | |

Notes:
1) Aroma of the sample rated as 1) acceptable, 2) slight off-odor, or 3) unacceptable off-odor

What is claimed is:

1. An acidified clay preservative safe for consumption comprising:
   (a) sparingly-soluble Group IIA complex ("AGIIS") blended with
   (b) a clay;
   (c) a human food or an animal feed;
   wherein the acidified clay preservative in food or feed comprising: an effective amount of acidified clay preservative for exerting anti-microbial or anti-toxin properties; the sparingly-soluble Group IIA complex comprises a temperature controlled reaction product of mixing a mineral acid with: a Group IIA hydroxide; a Group IIA salt of a dibasic acid, or a mixture of said Group IIA hydroxide or Group IIA salt materials thereof, wherein the resultant AGIIS complex is safe to eat, less corrosive and less volatile than said mineral acid; and wherein the AGIIS is blended with a calcium montmorillonite clay of substantially uniform particle size of about 80 microns forming the acidified clay preservative; wherein the isolated low sodium, calcium aluminosilicate clay has a chemical composition comprising: CaO above about 3.2%; MgO ranging from about 4.0 to about 5.4%; $Fe_2O_3$ ranging from about 5.4 to about 6.5%; $K_2O$ ranging from about 0.50 to about 0.90%; $Na_2O$ ranging from about 0.10 to about 0.30%; MnO ranging from about 0.01 to about 0.03%; $Al_2O_3$ ranging from about 14.8 to about 18.2%; and $SiO_2$ ranging from about 62.4 to about 73.5%; wherein, the chemical composition is given as weight percent.

2. The preservative of claim 1, wherein the weight ratio of the calcium montmorillonite clay to the acid or the acidic mixture ranges from about 50:1 to about 1:5.

3. The preservative of claim 1, wherein the sparingly-soluble Group IIA complex mixed with an organic acid forming an adduct of highly acidic metalated organic acid ("HAMO"); or further comprising the sparingly-soluble Group IIA complex mixed with an inorganic acid forming an adduct of highly acidic metalated mixture of inorganic acid ("HAMMIA"); or an adduct mixture thereof.

4. The preservative of claim 3, wherein the HAMO adduct comprises the reaction product of AGIIS with: a lactic acid, a propionic acid, or a mixture thereof.

5. The preservative of claim 1, wherein the calcium montmorillonite clay is an isolated low-sodium, calcium aluminosilicate clay that is substantially free from dioxins and priority toxic heavy metal contamination, and is capable of binding aflatoxins.

6. The preservative of claim 5, wherein the isolated low sodium, calcium aluminosilicate clay has a chemical composition comprising: CaO above about 3.2%; MgO ranging from about 4.0 to about 5.4%; $Fe_2O_3$ ranging from about 5.4 to about 6.5%; $K_2O$ ranging from about 0.50 to about 0.90%; $Na_2O$ ranging from about 0.10 to about 0.30%; MnO ranging from about 0.01 to about 0.03%; $Al_2O_3$ ranging from about 14.8 to about 18.2%; and $SiO_2$ ranging from about 62.4 to about 73.5%; wherein, the chemical composition is given as weight percent.

7. A composition comprising:
(a) an isolated low sodium, calcium aluminosilicate clay that is substantially free from dioxins and priority toxic heavy metal contamination, and is capable of binding the aflatoxins, the clay having a chemical composition comprising: CaO above about 3.2%; MgO ranging from about 4.0 to about 5.4%; $Fe_2O_3$ ranging from about 5.4 to about 6.5%; $K_2O$ ranging from about 0.50 to about 0.90%; $Na_2O$ ranging from about 0.10 to about 0.30%; MnO ranging from about 0.01 to about 0.03%; $Al_2O_3$ ranging from about 14.8 to about 18.2%; and $SiO_2$ ranging from about 62.4 to about 73.5%; wherein, the chemical composition is given as weight percent; and
(b) a sparingly-soluble Group IIA complex acid comprising a temperature controlled reaction product of mixing a mineral acid with: a Group IIA hydroxide; a Group IIA salt of a dibasic acid, or a mixture of said Group IIA hydroxide or Group IIA salt materials thereof, wherein the resultant AGIIS acid is safe to eat, less corrosive and less volatile than said mineral acid; and wherein the AGIIS acid mixed with an organic acid for an adduct of highly acidic metalated organic acid; or further comprising the AGIIS acid mixed with an inorganic acid forming an adduct of highly acidic metalated mixture of inorganic acid; or an adduct mixture thereof;
(c) a human food or an animal feed;
wherein the clay is blended with AGIIS acid; the HAMO adduct; or the HAMMIA adduct in a weight ratio of the clay to the AGIIS acid or said acidic of from about 50:1 to about 1:5, and the clay having a substantially uniform particle size of about 80 microns.

8. The preservative of claim 4 or claim 5, wherein the adduct comprises an alcohol.

9. The preservative of claim 8, wherein the alcohol is a lower alkyl alcohol.

10. The preservative of claim 4 or claim 5, wherein the adduct comprises a surface-active agent.

* * * * *